(12) United States Patent
Hwang et al.

(10) Patent No.: US 12,471,480 B2
(45) Date of Patent: Nov. 11, 2025

(54) DISPLAY DEVICE

(71) Applicant: Samsung Display Co., LTD., Yongin-si (KR)

(72) Inventors: Min Ha Hwang, Yongin-si (KR); Deok Hoi Kim, Yongin-si (KR); Dae Wook Kim, Yongin-si (KR); Dong Jin Moon, Yongin-si (KR); Hyun Joo Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/915,154

(22) Filed: Oct. 14, 2024

(65) Prior Publication Data
US 2025/0151568 A1    May 8, 2025

(30) Foreign Application Priority Data
Nov. 3, 2023    (KR) ................. 10-2023-0150986

(51) Int. Cl.
*H10K 59/40*    (2023.01)
*G06F 3/044*    (2006.01)
*H10K 59/131*    (2023.01)
*H10K 59/80*    (2023.01)

(52) U.S. Cl.
CPC ........... *H10K 59/40* (2023.02); *G06F 3/0446* (2019.05); *H10K 59/1315* (2023.02); *H10K 59/8792* (2023.02)

(58) Field of Classification Search
CPC ........ H10K 59/40; G06F 3/044; G06F 3/0446
See application file for complete search history.

(56) References Cited

U.S. PATENT DOCUMENTS 7,157,739 B2    1/2007   Nimura et al.
9,323,326 B2 *  4/2016   Cruz-Hernandez .......................... G06F 3/04166
10,732,762 B2   8/2020   Na et al.
(Continued)

FOREIGN PATENT DOCUMENTS

KR           10-0575575 B1    5/2006
KR       10-2020-0102036 A    8/2020
(Continued)

*Primary Examiner* — Kevin M Nguyen
(74) *Attorney, Agent, or Firm* — Womble Bond Dickinson (US) LLP

(57) ABSTRACT

A display device includes a panel layer including a display area, a light-blocking layer above the panel layer, and defining a light-blocking area surrounding at least a portion of the display area, and an input-sensing layer between the panel layer and the light-blocking layer, defining a sensing area, and including a first conductive layer including a first constant voltage electrode layer, at least a portion of which being in a non-light-blocking area between the light-blocking area and the display area, a second conductive layer including a second constant voltage electrode layer, at least a portion of which being in the non-light-blocking area, and electrically contacting the first constant voltage electrode layer through first through holes in the non-light-blocking area, and a sensing-insulating layer between the first conductive layer and the second conductive layer, and defining the first through holes, wherein distances between adjacent first through holes vary.

20 Claims, 23 Drawing Sheets

(56) References Cited

U.S. PATENT DOCUMENTS

| | | | |
|---|---|---|---|
| 11,042,252 B2 | 6/2021 | Jeong et al. | |
| 11,054,950 B2 | 7/2021 | Eom et al. | |
| 2018/0239477 A1* | 8/2018 | Yang | G09G 3/2074 |
| 2024/0176446 A1* | 5/2024 | Wu | G06F 3/041662 |
| 2024/0237460 A1 | 7/2024 | Park et al. | |
| 2024/0292707 A1 | 8/2024 | Park et al. | |

FOREIGN PATENT DOCUMENTS

| | | |
|---|---|---|
| KR | 10-2020-0113090 A | 10/2020 |
| KR | 10-2348106 B1 | 1/2022 |
| KR | 10-2024-0110732 A | 7/2024 |
| KR | 10-2024-0133918 A | 9/2024 |

* cited by examiner

CVE: CVE1, CVE2
SL1: SL1a, SL1b
SL1a: SL1a_L, SL1a_U
SL1b: SL1b_L, SL1b_U

SL1'_L: SL1a'_L, SL1b'_L, SL1c'_L, SL1d'_L

CVE': CVE1', CVE2'
SL1a': SL1a'_L, SL1a'_L
SL1b': SL1b'_L, SL1b'_U

DISPLAY DEVICE

CROSS-REFERENCE TO RELATED APPLICATION

The present application claims priority to, and the benefit of, Korean Patent Application No. 10-2023-0150986, filed on Nov. 3, 2023, in the Korean Intellectual Property Office, the entire disclosure of which is incorporated herein by reference.

BACKGROUND

1. Field

The present disclosure relates to a display device.

2. Description of the Related Art

The display device may include a display area where an image is displayed, and a bezel area where the image is not displayed.

Meanwhile, between the display area and the bezel area, external light reflected by various components (e.g., electrodes, lines, etc.) included in the display device may be visible to the user of the display device, thereby reducing visibility of the display device.

SUMMARY

An aspect of the present disclosure provides a display device with improved visibility.

A display device includes a panel layer including pixels in a display area, a light-blocking layer above the panel layer, and defining a light-blocking area surrounding at least a portion of the display area in a plane view, and an input-sensing layer between the panel layer and the light-blocking layer, defining a sensing area corresponding to the display area, and including a first conductive layer including a first constant voltage electrode layer, at least a portion of which being in a non-light-blocking area between the light-blocking area and the display area in a plane view, a second conductive layer including a second constant voltage electrode layer, at least a portion of which being in the non-light-blocking area, and electrically contacting the first constant voltage electrode layer through first through holes in the non-light-blocking area, and a sensing-insulating layer between the first conductive layer and the second conductive layer, and defining the first through holes, wherein respective distances between respective adjacent ones of the first through holes vary.

In a plane view, the first through holes may have a planar shape including a circle, an oval, or a polygon.

The first through holes may have a same planar shape.

In a plane view, an area occupied by the first through holes in the non-light-blocking area may be about 0.5% or more and about 10% or less of an area where the first constant voltage electrode layer and the second constant voltage electrode layer overlap each other in the non-light-blocking area.

The first constant voltage electrode layer may include a first constant voltage electrode pattern and a second constant voltage electrode pattern spaced apart in a plane view, and electrically contacting the second constant voltage electrode layer through the first through holes.

The first conductive layer may further include a first transmission line layer having at least a portion in the non-light-blocking area, wherein the second conductive layer further includes a second transmission line layer having at least a portion in the non-light-blocking area, and wherein the first transmission line layer and the second transmission line layer electrically contact each other in the non-light-blocking area through second through holes defined in the sensing-insulating layer.

In a plane view, the second constant voltage electrode layer may be between the second transmission line layer and the sensing area, wherein the first transmission line layer includes a portion extending in a direction toward the sensing area between the first constant voltage electrode pattern and the second constant voltage electrode pattern.

The first transmission line layer and the second transmission line layer may be electrically insulated from the first constant voltage electrode layer and the second constant voltage electrode layer.

Respective distances between adjacent ones of the second through holes may vary.

One of the first conductive layer or the second conductive layer may further include, in the sensing area, first sensing electrode patterns, second sensing electrode patterns, and a second connection pattern electrically connecting the second sensing electrode patterns, wherein another of the first conductive layer or the second conductive layer further includes a first connection pattern in the sensing area, and electrically connecting the first sensing electrode patterns.

The first sensing electrode patterns may be electrically insulated from the second sensing electrode patterns.

A display device according to embodiments of the present disclosure includes a panel layer including pixels in a display area, a light-blocking layer above the panel layer, and defining a light-blocking area surrounding at least a portion of the display area in a plane view, and an input-sensing layer between the panel layer and the light-blocking layer, defining a sensing area corresponding to the display area, and including a first conductive layer including a first constant voltage electrode layer having at least a portion in a non-light-blocking area between the light-blocking area and the display area, a second conductive layer including a second constant voltage electrode layer having at least a portion in the non-light-blocking area, and electrically contacting the first conductive layer through first holes in the non-light-blocking area, and a sensing-insulating layer between the first conductive layer and the second conductive layer, and defining the first through holes, wherein, in a plane view, an area occupied by the first through holes in the non-light-blocking area is about 0.5% or more and about 5% or less of an area where the first constant voltage electrode layer and the second constant voltage electrode layer overlap each other in the non-light-blocking area.

Respective distances between adjacent ones of the first through holes may be constant.

In a plane view, the first through holes may have a planar shape including a circle, an oval, or a polygon.

The first through holes may have a same planar shape.

The first constant voltage electrode layer may include a first constant voltage electrode pattern and a second constant voltage electrode pattern spaced apart in a plane view, wherein the first constant voltage electrode pattern and the second constant voltage electrode pattern electrically contact the second constant voltage electrode layer through the first through holes.

The first conductive layer may further include a first transmission line layer having at least a portion in the non-light-blocking area, wherein the second conductive layer further includes a second transmission line layer having at least a portion in the non-light-blocking area, and wherein, in the non-light-blocking area, the first transmission line layer and the second transmission line layer electrically contact each other through second through holes defined in the sensing-insulating layer.

In a plane view, the second constant voltage electrode layer may be between the second transmission line layer and the sensing area, wherein the first transmission line layer includes a portion extending in a direction toward the sensing area through a space between the first constant voltage electrode pattern and the second constant voltage electrode pattern.

The first transmission line layer and the second transmission line layer may be electrically insulated from the first constant voltage electrode layer and the second constant voltage electrode layer.

In a plane view, an area occupied by the second through holes in the non-light-blocking area may be about 0.5% or more and about 5% or less of an area where the first transmission line layer and the second transmission line layer overlap each other in the non-light-blocking area.

In the display device according to embodiments of the present disclosure, to electrically contact the first constant voltage electrode layer to the second constant voltage electrode layer in the non-light-blocking area between the light-blocking area and the display area (in a plane view), there may be randomly located a plurality of first through holes defined in the sensing-insulating layer interposed between the first constant voltage electrode layer and the second constant voltage electrode layer. Accordingly, even when external light incident on the non-light-blocking area is reflected by the second constant voltage electrode layer formed along the cross-sectional profile of the plurality of first through holes, the interference phenomenon caused by the external light can be reduced or minimized. Accordingly, visibility of the display device can be improved.

In the display device according to embodiments of the present disclosure, to contact electrically the first constant voltage electrode layer and the second constant voltage electrode layer each other in the non-light-blocking area between the light-blocking area and the display area in a plane view, a plurality of first through holes defined in the sensing-insulating layer interposed between the first constant voltage electrode layer and the second constant voltage electrode layer, may be located at a relatively low density. Accordingly, even when external light incident on the non-light-blocking area is reflected by the second constant voltage electrode layer formed along the cross-sectional profile of the plurality of first through holes, the interference phenomenon caused by the external light can be reduced or minimized. Accordingly, visibility of the display device can be improved.

DETAILED DESCRIPTION

Figure 1:
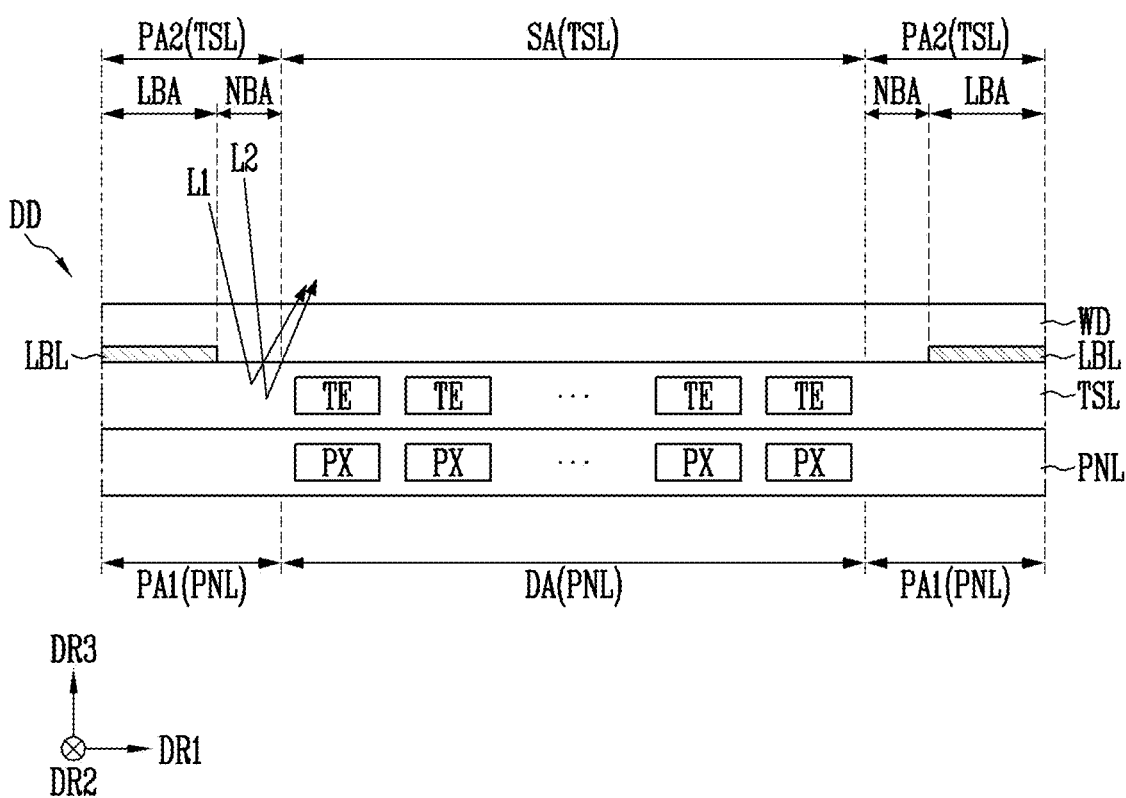
FIG. 1 depicts a display device according to embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more eighth embodiments corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a drawing for describing a display device according to embodiments of the present disclosure.

Referring to FIG. 1, a display device DD may include a panel layer PNL, an input-sensing layer TSL, a light-blocking layer LBL, and a window WD.

The panel layer PNL may include a plurality of pixels PX. Each of the plurality of pixels PX may emit light, and the display device DD may display an image by combining the light emitted from the plurality of pixels PX.

An area where the plurality of pixels PX is located in the panel layer PNL may be referred to as the display area DA. Meanwhile, an area where the plurality of pixels PX is not located in the panel layer PNL may be referred to as the first peripheral area PA1. Various components (e.g., electrodes, circuits, lines, etc.) may be located in the first peripheral area PA1 to provide electrical signals to the plurality of pixels PX.

The input-sensing layer TSL may be located on the panel layer PNL. The input-sensing layer TSL may be formed integrally with the panel layer PNL, or may be formed separately from the panel layer PNL and then attached on the panel layer PNL.

The input-sensing layer TSL may include a plurality of sensing electrodes TE. The plurality of sensing electrodes TE may detect a user's touch input of the display device DD.

An area where a plurality of sensing electrodes TE is located in the input-sensing layer TSL may be referred to as a sensing area SA. Meanwhile, an area where the plurality of sensing electrodes TE is not located in the input-sensing layer TSL may be referred to as the second peripheral area PA2. Various components (e.g. electrodes, circuits, line, etc.) to transmit an input signal sensed from a plurality of sensing electrodes TE, or to provide an electric signal to a plurality of sensing electrodes TE and/or a plurality of pixels PX, may be located in the second peripheral area PA2.

Meanwhile, as shown in FIG. 1, the display area DA of the panel layer PNL and the sensing area SA of the input-sensing layer TSL may substantially overlap. Accordingly, it is possible to sense the touch input of the user of the display device DD in the display area DA where the image is displayed.

In this case, the plurality of sensing electrodes TE may be formed of a transparent conductive material, or may be formed in a mesh pattern that does not overlap the plurality of pixels PX in a plane view. Here, "plane" may refer to plane that is perpendicular to the third direction DR3, which is a stacking direction of the panel layer PNL, the input-sensing layer TSL, the light-blocking layer LBL, and the window WD included in the display device DD, and which is defined by the first direction DR1 and the second direction DR2 crossing each other. Accordingly, light emitted from the plurality of pixels PX may not be substantially blocked by the plurality of sensing electrodes TE.

The light-blocking layer LBL may be located on the input-sensing layer TSL. The light-blocking layer LBL may include a material that blocks light. Accordingly, an area where the light-blocking layer LBL is located may be referred to as the light-blocking area LBA.

The light-blocking area LBA may not substantially overlap the display area DA. For example, the light-blocking area LBA may be formed to surround at least a portion of the display area DA. In this case, the user of the display device DD may perceive the light-blocking area LBA as a bezel area where an image is not displayed.

As described above, the light-blocking area LBA may not substantially overlap the display area DA. Accordingly, the light-blocking layer LBL located in the light-blocking area LBA may not substantially block light emitted from the plurality of pixels PX. In this case, the light-blocking layer LBL located in the light-blocking area LBA may serve to block external light incident from the outside of the display device DD.

In one or more embodiments, as shown in FIG. 1, a non-light-blocking area NBA may be defined as an area between the light-blocking area LBA and the display area DA. That is, the light-blocking area LBA may not completely overlap the first peripheral area PA1 and/or the second peripheral area PA2. This means that when the light-blocking area LBA completely overlaps the first peripheral area PA1 and/or the second peripheral area PA2, an area of the bezel area perceived by the user of the display device DD becomes relatively large. Here, when the area of the bezel area becomes relatively large, the convenience of use for users of the display device DD may be reduced.

For the above-mentioned reason, as the non-light-blocking area NBA is defined as an area between the display area DA and the light-blocking area LBA, external light L1 and L2 may enter through the non-light-blocking area NBA. The external light L1 and L2 may be reflected by various components (e.g., electrodes, circuits, line, etc.) located in the second peripheral area PA2 of the input-sensing layer TSL. In this case, various patterns (e.g., rainbow patterns, etc.) may be visible due to the interference phenomenon caused by the reflected external light L1 and L2. Accordingly, the visibility or quality of the display device DD may be reduced.

The window WD may be located on the input-sensing layer TSL and the light-blocking layer LBL. The window WD may include a material that has relatively high rigidity and relatively high light transmittance.

Below, the configurations of the present disclosure for preventing the above-described decrease in visibility will be described.

Figure 2:
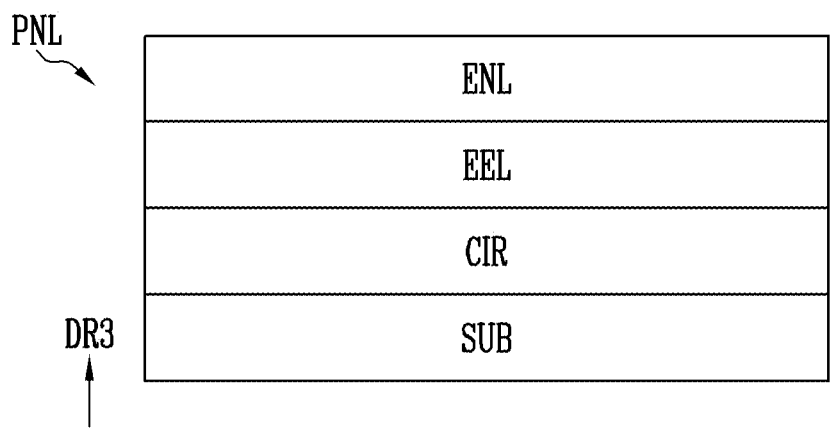
FIGS. 2 and 3 depict panel layers included in the display device of FIG. 1.
Figure 3:
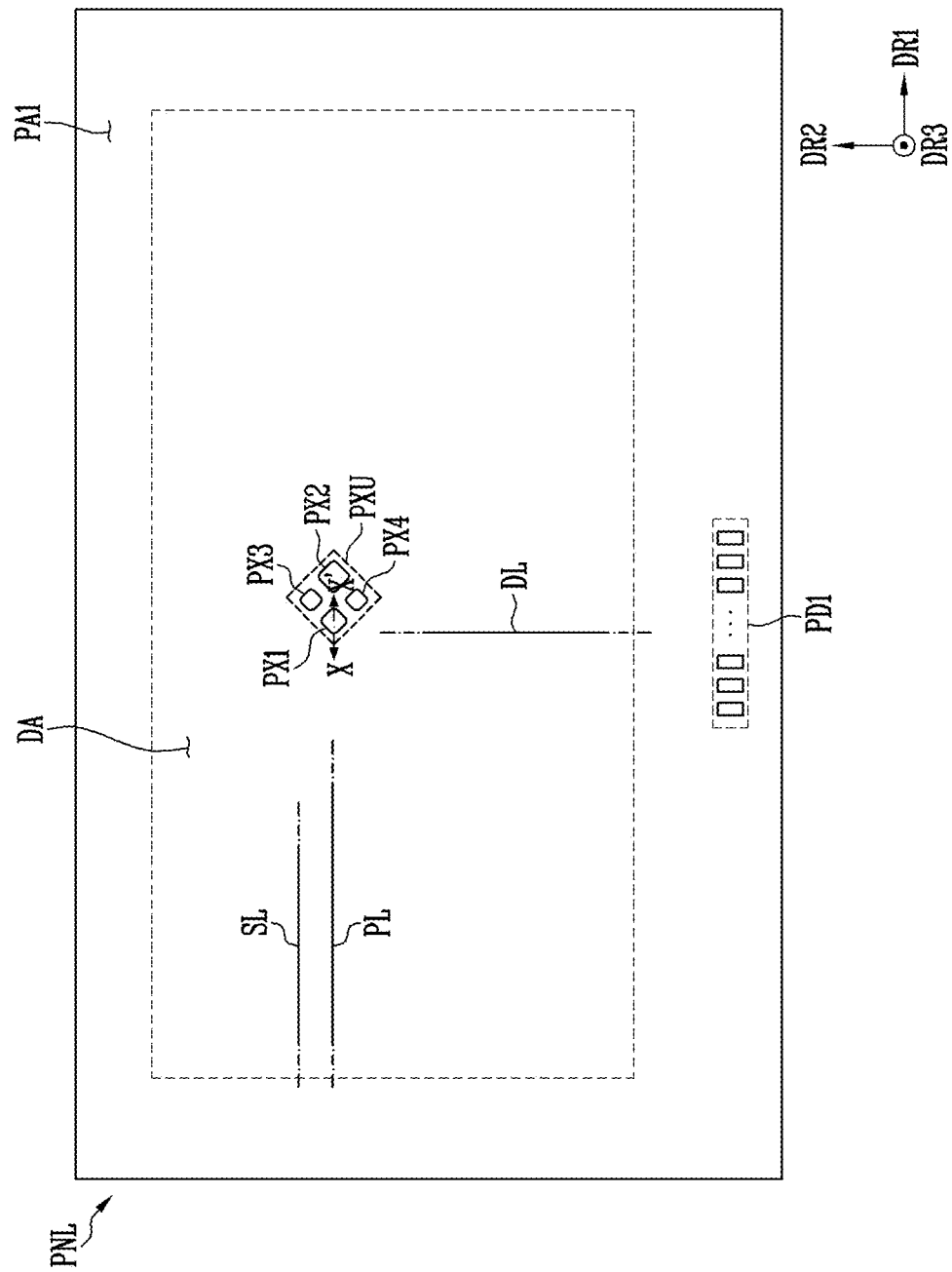
Figure 4:
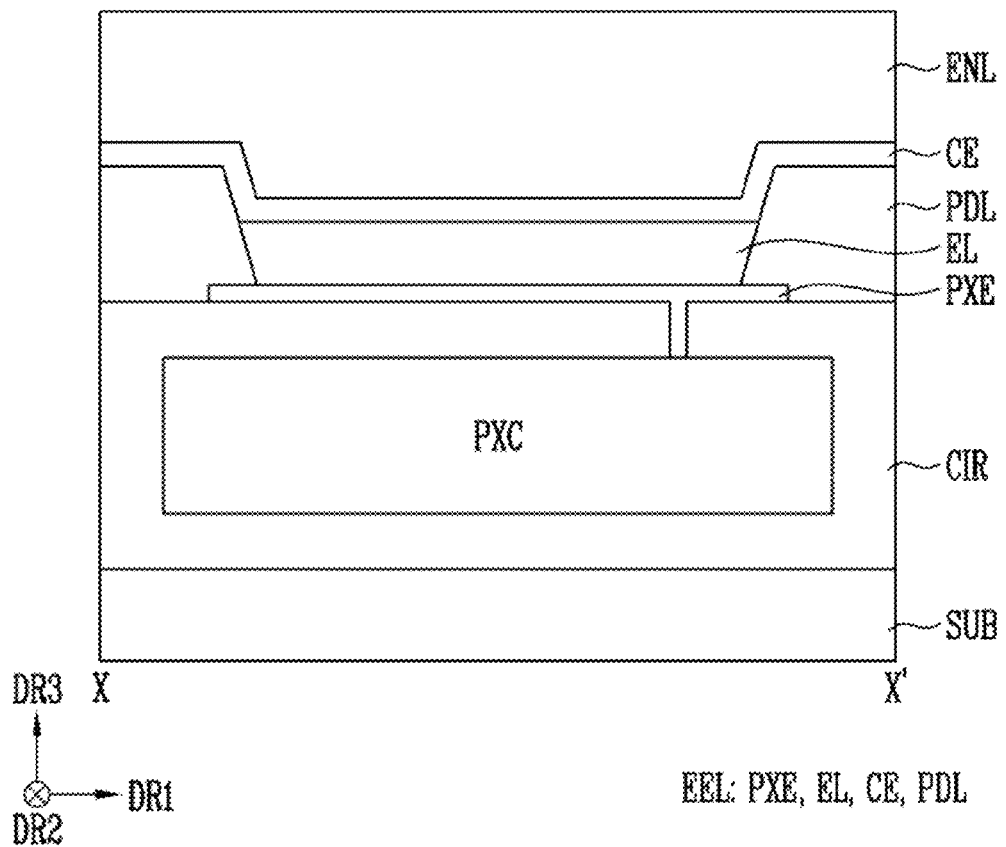
FIG. 4 is a cross-sectional view taken along the line X-X' of FIG. 3.

FIGS. 2 and 3 are drawings for describing the panel layer included in the display device of FIG. 1, and FIG. 4 is a cross-sectional view taken along the line X-X' of FIG. 3.

Referring to FIG. 2, the panel layer PNL may include a substrate SUB, a circuit layer CIR, a light-emitting element layer EEL, and an encapsulation layer ENL.

The substrate SUB may be rigid or flexible. The substrate SUB may include various materials, such as glass, plastic, etc.

The circuit layer CIR may be located on ("on," as used herein, may also mean "above") the substrate SUB. The circuit layer CIR may include at least one transistor and at least one capacitor. Additionally, the circuit layer CIR may further include at least one line and at least one electrode. To this end, the circuit layer CIR may include a plurality of insulating layers and a conductive layer interposed between two adjacent insulating layers among the plurality of insulating layers, sequentially stacked in the third direction DR3.

The light-emitting element layer EEL may include various components capable of emitting light based on an electrical signal provided from the circuit layer CIR. For example, when the display device DD is an organic light-emitting display device, the light-emitting element layer EEL may include an anode electrode, a cathode electrode, and an organic light-emitting layer interposed between the anode electrode and the cathode electrode.

The encapsulation layer ENL may be located on the light-emitting element layer EEL. The encapsulation layer ENL may cover the light-emitting element layer EEL and the circuit layer CIR, and may serve to protect the light-emitting element layer EEL and the circuit layer CIR from moisture penetrating from the outside.

Referring to FIG. 3, a unit pixel PXU and a plurality of lines may be located in the display area DA of the panel layer PNL, and a first pad array PD1 may be located in the first peripheral area PA1.

The unit pixel PXU may include a plurality of pixels arranged according to a corresponding rule. A plurality of unit pixels PXU may be provided in the display area DA. In this case, the plurality of unit pixels PXU may fill the display area DA without blank space.

In one or more embodiments, the unit pixel PXU may include first to fourth pixels PX1, PX2, PX3, and PX4. The first to fourth pixels PX1, PX2, PX3, and PX4 may correspond to four vertices of a virtual rhombus. The third pixel PX3 and the fourth pixel PX4 may have a relatively small planar area, and may emit light of a first color, the second pixel PX2 may have a relatively large planar area, and may emit light of a second color, and the first pixel PX1 may emit light of a third color. However, the description for the plurality of pixels included in the above-described unit pixel PXU is an example, and the unit pixel PXU may include two or more pixels having various shapes, sizes, and arrangements in a plane view.

In one or more embodiments, the plurality of lines located in the display area DA may include a scan line SL, a data line DL, and a power line PL.

The scan line SL may extend in the first direction DR1 in the display area DA. Meanwhile, the scan line SL may extend in a direction that is opposite to the first direction DR1, and accordingly, the scan line SL may extend in the first peripheral area PA1. In this case, the scan line SL may be electrically connected to a driving circuit (e.g., gate-driving circuit) located in the first peripheral area PA1.

The data line DL may extend in the second direction DR2 in the display area DA. Meanwhile, the data line DL may extend in a direction opposite to the second direction DR2, and accordingly, the data line DL may extend in the first peripheral area PA1. In this case, the data line DL may be electrically connected to a driving circuit (e.g., IC chip or data-driving circuit) located in the first peripheral area PA1.

The power line PL may extend in the first direction DR1 in the display area DA. Meanwhile, the power line PL may extend in the direction opposite to the first direction DR1, and accordingly, the power line PL may extend in the first peripheral area PA1. In this case, the power line PL may be electrically connected to a driving circuit (e.g., power supply circuit) located in the first peripheral area PA1.

In FIG. 3, for convenience of description, only one scan line SL, one power line PL, and one data line DL are shown. However, a plurality of scan lines SL, a plurality of power lines PL, and a plurality of data lines DL may be provided. In this case, the plurality of scan lines SL may be arranged in the second direction DR2 in the display area DA, the plurality of data lines DL may be arranged in the first direction DR1 in the display area DA, and the plurality of power lines PL may be arranged in the second direction DR2 in the display area DA. Meanwhile, according to embodiments, a plurality of power lines PL in the display area DA may have a mesh structure including a plurality of first power lines extending in the first direction DR1 and a plurality of second power lines electrically connected to the first power lines and extending in the second direction DR2.

The first pad array PD1 may include a plurality of pads. The plurality of pads may be electrically connected to the driving circuit (e.g., gate-driving circuit, IC chip, data-driving circuit, power supply circuit, etc.). Additionally, in one or more embodiments, the plurality of pads may be electrically connected to an electronic device that supplies various electrical signals.

In one or more embodiments, the panel layer PNL may be bent in the first peripheral area PA1. Accordingly, unlike shown in FIG. 3, the first pad array PD1 may be located on a rear surface of the panel layer PNL, in one or more embodiments.

Referring to FIG. 4, when the display device DD is an organic light-emitting display device, the panel layer PNL may include a pixel circuit PXC, a pixel electrode PXE, a pixel-defining layer PDL, an organic light-emitting layer EL, and a common electrode layer CE. However, this is an example, and the display device DD of the present disclosure is not limited to the organic light-emitting display device. For example, the display device DD may be an inorganic light-emitting display device or a liquid crystal display device.

The pixel circuit PXC may be defined by a plurality of conductive layers and a plurality of insulating layers included in the circuit layer CIR. The pixel circuit PXC may include at least one transistor and at least one capacitor. In embodiments, the pixel circuit PXC may further include lines (e.g., scan line SL, power line PL, and/or data line DL).

The pixel electrode PXE may be located on the circuit layer CIR. The pixel electrode PXE may be electrically connected to the pixel circuit PXC through a through hole penetrating at least a portion of the plurality of insulating layers included in the circuit layer CIR. In one or more embodiments, the pixel electrode PXE may be referred to as an anode electrode.

The pixel-defining layer PDL may be located on the circuit layer CIR and may define a pixel opening that exposes at least a portion of the pixel electrode PXE. The pixel-defining layer PDL may include an organic insulating material and/or an inorganic insulating material.

The organic light-emitting layer EL may be located on the pixel electrode PXE within the pixel opening. The organic light-emitting layer EL may emit light with luminance corresponding to a voltage difference between the pixel electrode PXE and the common electrode layer CE.

The common electrode layer CE may cover the organic light-emitting layer EL and the pixel-defining layer PDL. In one or more embodiments, the common electrode layer CE may be referred to as a cathode electrode.

The common electrode layer CE may be covered by the encapsulation layer ENL. In this case, in one or more embodiments, the encapsulation layer ENL may include a first inorganic insulating layer, an organic insulating layer, and a second inorganic insulating layer sequentially located in the third direction DR3 on the common electrode layer CE.

Figure 5:
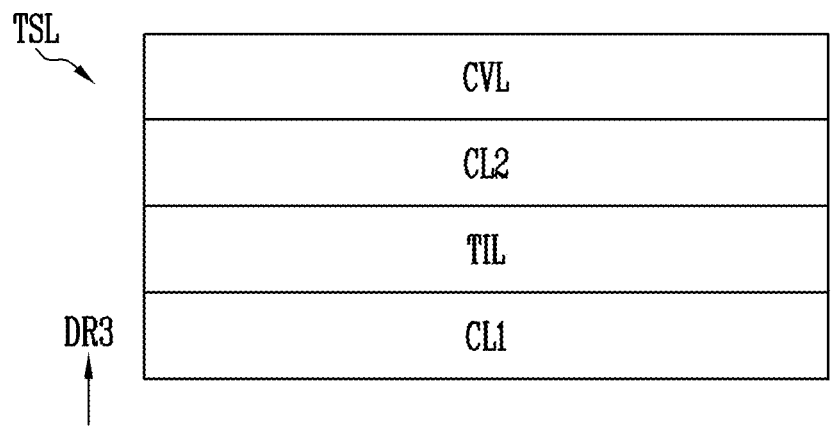
FIGS. 5 and 6 depict one or more embodiments of an input-sensing layer included in the display device of FIG. 1.
Figure 6:
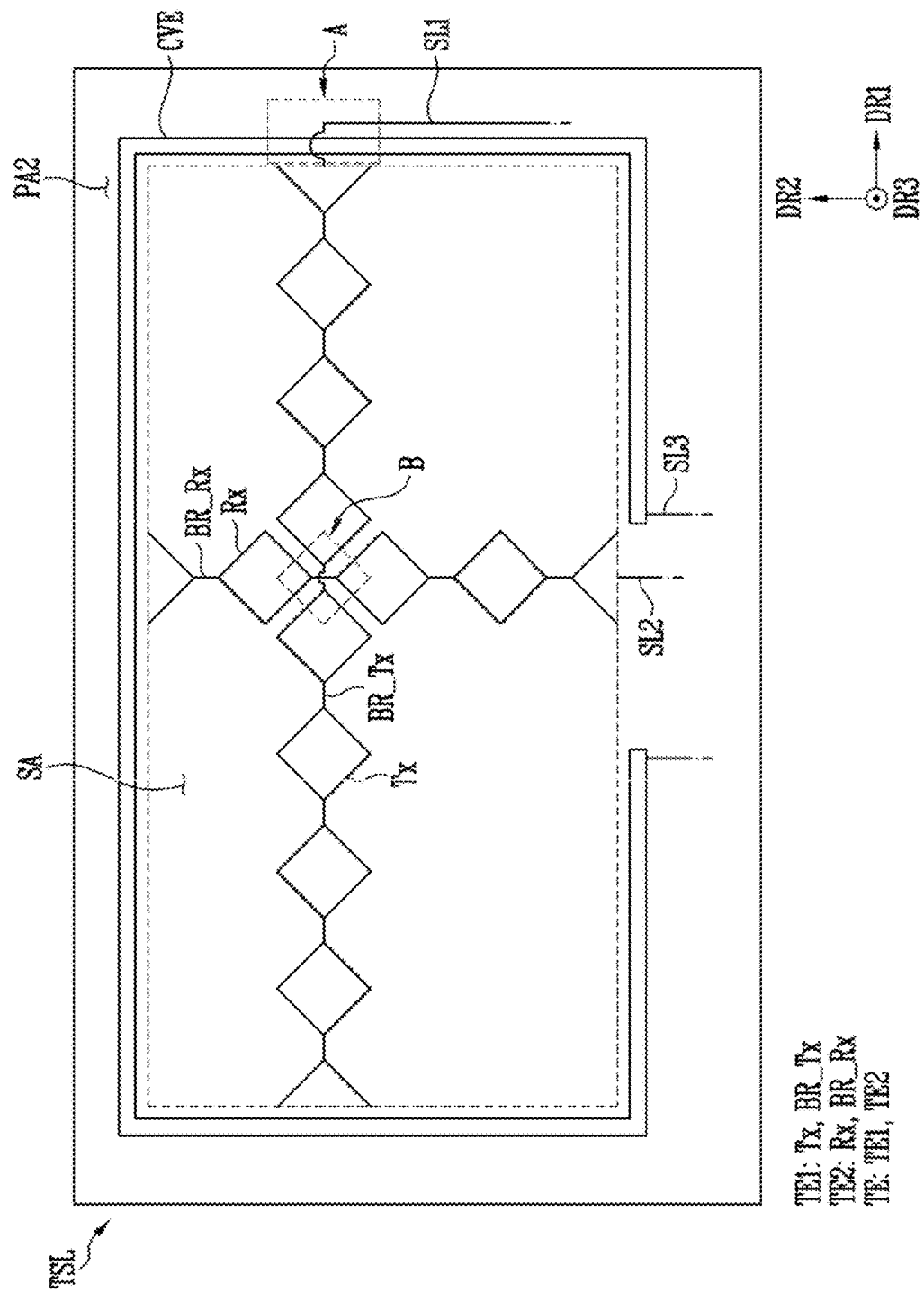

FIGS. 5 and 6 are drawings for describing one or more embodiments of an input-sensing layer included in the display device of FIG. 1.

Referring to FIG. 5, the input-sensing layer TSL may include a first conductive layer CL1, a sensing-insulating layer TIL, a second conductive layer CL2, and a cover layer CVL.

In one or more embodiments, the first conductive layer CL1, the sensing-insulating layer TIL, the second conductive layer CL2, and the cover layer CVL may be sequentially stacked in the third direction DR3. That is, the second conductive layer CL2 may be located on the first conductive layer CL1, and the sensing-insulating layer TIL may be interposed between the first conductive layer CL1 and the second conductive layer CL2.

In one or more other embodiments, the first conductive layer CL1 may be located on the second conductive layer CL2. In this case, various components included in the first conductive layer CL1, which will be described later with reference to FIGS. 7 to 19, may be interposed between the sensing-insulating layer TIL and the cover layer CVL, and various components included in the second conductive layer CL2 may be interposed between the sensing-insulating layer TIL and the panel layer PNL.

Hereinafter, the display device DD of the present disclosure and the components included therein will be described based on one or more embodiments in which the second conductive layer CL2 is located on the first conductive layer CL1. Here, one or more embodiments in which the first conductive layer CL1 is located on the second conductive layer CL2 will be described in detail later with reference to FIGS. 20 to 24.

Referring to FIG. 6, a plurality of sensing electrodes TE may be located in the sensing area SA of the input-sensing layer TSL, and a constant voltage electrode CVE, a first transmission line SL1, a second transmission line SL2, and a third transmission line SL3 may be located in the second peripheral area PA2.

The plurality of sensing electrodes TE may include a first sensing electrode TE1 and a second sensing electrode TE2.

The first sensing electrode TE1 may include a plurality of first sensing electrode patterns Tx, and a first connection pattern BR_Tx that electrically connects the plurality of first sensing electrode patterns Tx to each other. The first sensing electrode TE1 may extend in the first direction DR1 in the sensing area SA. The first sensing electrode TE1 may serve to convert the touch input of the user of the display device DD into an electrical signal.

The second sensing electrode TE2 may include a plurality of second sensing electrode patterns Rx and a second connection pattern BR_Rx that electrically connects the plurality of second sensing electrode patterns Rx to each other. The second sensing electrode TE2 may extend in the second direction DR2 in the sensing area SA. Like the first sensing electrode TE1, the second sensing electrode TE2 may serve to convert the touch input of the user of the display device DD into an electrical signal.

The first sensing electrode TE1 and the second sensing electrode TE2 may be electrically insulated from each other. In other words, the first sensing electrode patterns Tx included in the first sensing electrode TE1 may be electrically insulated from the second sensing electrode patterns Rx included in the second sensing electrode TE2.

The constant voltage electrode CVE may surround at least a portion of the sensing area SA (e.g., in plan view). A constant voltage may be applied to the constant voltage electrode CVE. For example, a ground voltage may be applied to the constant voltage electrode CVE, and the ground voltage may be applied to the sensing electrodes TE located in the sensing area SA, or to the common electrode layer (CE in FIG. 4) located in the display area (DA in FIG. 3). For another example, a power voltage may be applied to the constant voltage electrode CVE, and the power supply voltage may be applied to the power line PL located in the display area (DA in FIG. 3), or to the common electrode layer (CE in FIG. 4).

The first transmission line SL1 may be electrically connected to the first sensing electrode TE1 at the boundary between the sensing area SA and the second peripheral area PA2. The first transmission line SL1 may be electrically connected to a separate sensing circuit unit or sensing pad unit located in the second peripheral area PA2 or in the first peripheral area (PA1 in FIG. 3). The first transmission line SL1 may serve to transmit an electrical signal generated in the first sensing electrode TE1 based on the touch input of the user of the display device DD.

The second transmission line SL2 may be electrically connected to the second sensing electrode TE2 at the boundary between the sensing area SA and the second peripheral area PA2. The second transmission line SL2 may be electrically connected to a separate sensing circuit unit or sensing pad unit located in the second peripheral area PA2 or in the first peripheral area (PA1 in FIG. 3). The second transmission line SL2 may serve to transmit an electrical signal generated in the second sensing electrode TE2 based on the touch input of the user of the display device DD.

The third transmission line SL3 may be electrically connected to the constant voltage electrode CVE. The third transmission line SL3 may be electrically connected to a separate power supply unit or ground pad unit located in the second peripheral area PA2 or in the first peripheral area (PA1 in FIG. 3).

In FIG. 6, for convenience of description, only one first sensing electrode TE1 and one second sensing electrode TE2 are shown, but a plurality of first sensing electrode TE1 and a plurality of the second sensing electrode TE2 may be provided. Additionally, a plurality of first transmission lines SL1 may be provided in a one-to-one correspondence with the plurality of first sensing electrodes TE1, and the second transmission line SL2 may be provided in a one-to-one correspondence with the plurality of second sensing electrodes TE2.

In this case, the plurality of first sensing electrodes TE1 may be arranged in the second direction DR2 in the sensing area SA, and the plurality of second sensing electrodes TE2 may be arranged in the first direction DR1 in the sensing area SA. Accordingly, the first and second sensing electrodes TE1 and TE2 may be entirely located in the sensing area SA.

Figure 7:
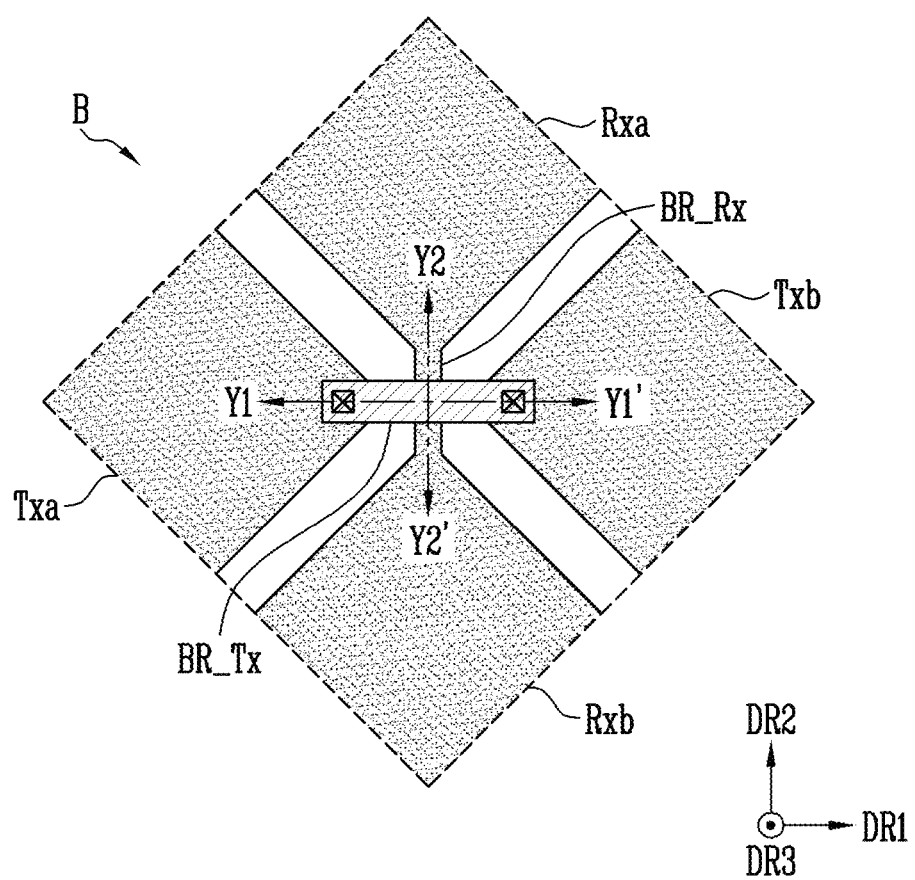
FIG. 7 is an enlarged plan view of an area B of FIG. 6.
Figure 8:
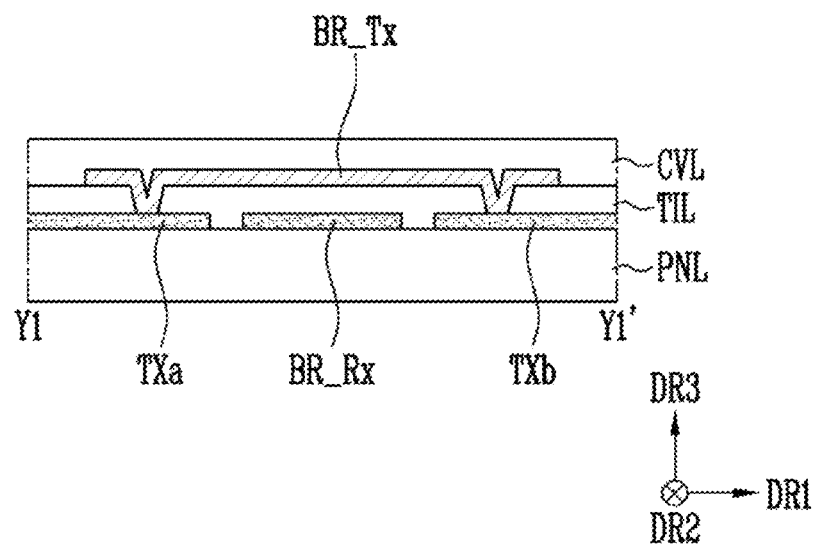
FIG. 8 is a cross-sectional view taken along the line Y1-Y1' of FIG. 7.
Figure 9:
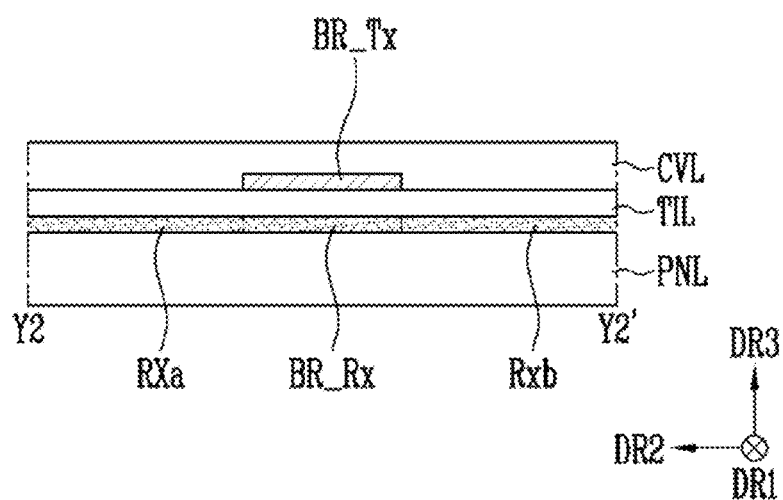
FIG. 9 is a cross-sectional view taken along the line Y2-Y2' of FIG. 7.

FIG. 7 is an enlarged plan view of an area B of FIG. 6, FIG. 8 is a cross-sectional view taken along the line Y1-Y1' of FIG. 7, and FIG. 9 is a cross-sectional view taken along the line Y2-Y2' of FIG. 7.

Referring to FIG. 7, the plurality of first sensing electrode patterns Tx may include two first sensing electrode patterns Txa and Txb located adjacent to each other, and the plurality of second sensing electrode patterns Rx may include two second sensing electrode patterns Rxa and Rxb located adjacent to each other.

The first sensing electrode patterns Txa and Txb may be electrically connected to each other by the first connection pattern BR_Tx, and the second sensing electrode patterns Rxa and Rxb may be electrically connected to each other by the second connection pattern BR_Rx. In this case, as shown in FIG. 7, the second sensing electrode patterns Rxa and Rxb and the second connection pattern BR_Rx may be formed integrally.

Referring to FIGS. 8 and 9, each of the first sensing electrode patterns Txa and Txb, the second sensing electrode patterns Rxa and Rxb, and the second connection pattern BR_Rx may be located on the panel layer PNL, and the first connection pattern BR_Tx may be located on the sensing-insulating layer TIL. That is, the first sensing electrode patterns Txa and Txb, the second sensing electrode patterns Rxa and Rxb, and the second connection pattern BR_Rx may be components included in the first conductive layer (CL1 in FIG. 5), and the first connection pattern BR_Tx may be components included in the second conductive layer (CL2 in FIG. 5).

The first connection pattern BR_Tx may electrically contact each of the first sensing electrode patterns Txa and Txb through a through hole defined in the sensing-insulating layer TIL. In this case, the first connection pattern BR_Tx may be electrically insulated from the second connection pattern BR_Rx by the sensing-insulating layer TIL.

Meanwhile, unlike shown in FIGS. 7 to 9, each of the first sensing electrode patterns Txa and Txb, the second sensing electrode patterns Rxa and Rxb, and the second connection pattern BR_Rx may be located on the sensing-insulating layer TIL, and the first connection pattern BR_Tx may be located on the panel layer PNL.

That is, unlike shown in FIGS. 7 to 9, the first sensing electrode patterns Txa and Txb, the second sensing electrode patterns Rxa and Rxb, and the second connection pattern BR_Rx may be components included in the second conductive layer (CL2 in FIG. 5), and the first connection pattern BR_Tx may be components included in the first conductive layer (CL1 in FIG. 5).

Figure 10:
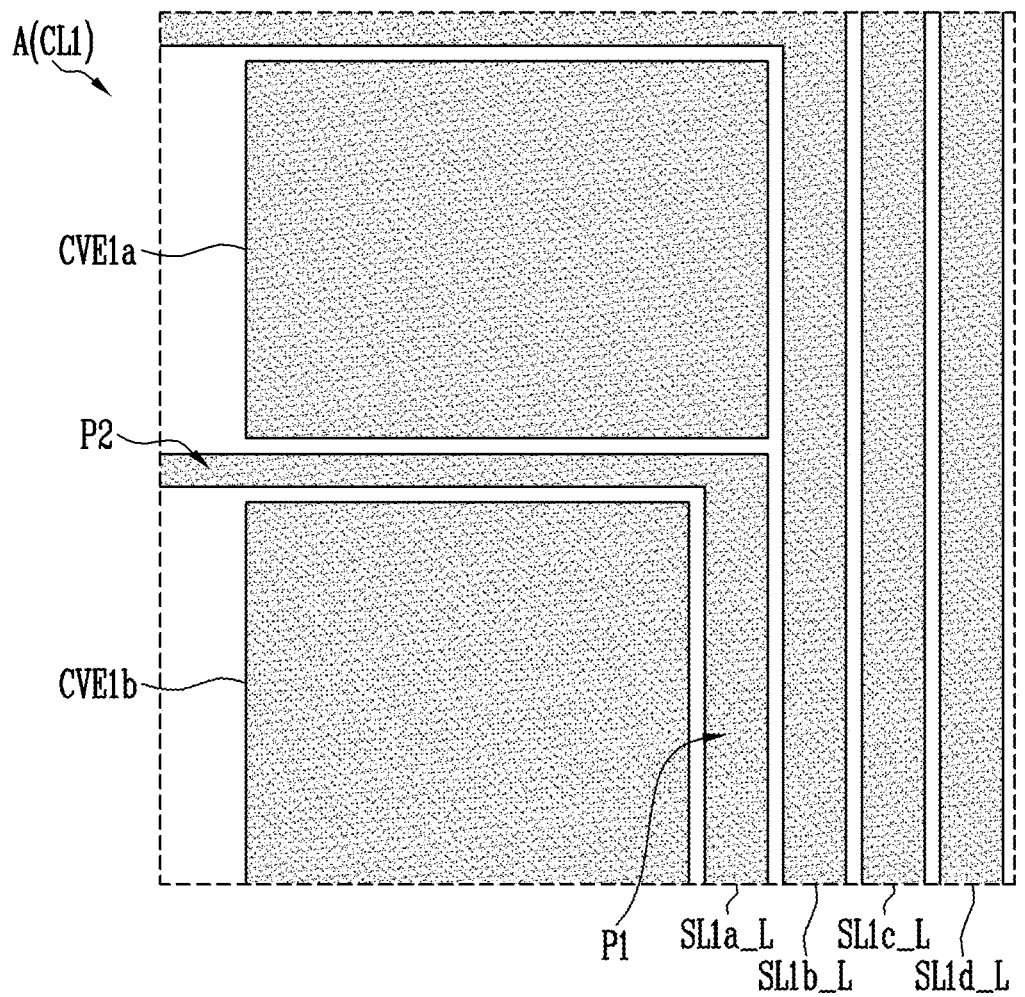
FIG. 10 is a plan view for describing various electrodes and lines implemented with a first conductive layer included in an input-sensing layer of FIG. 5 in an area A of FIG. 6.
Figure 11:
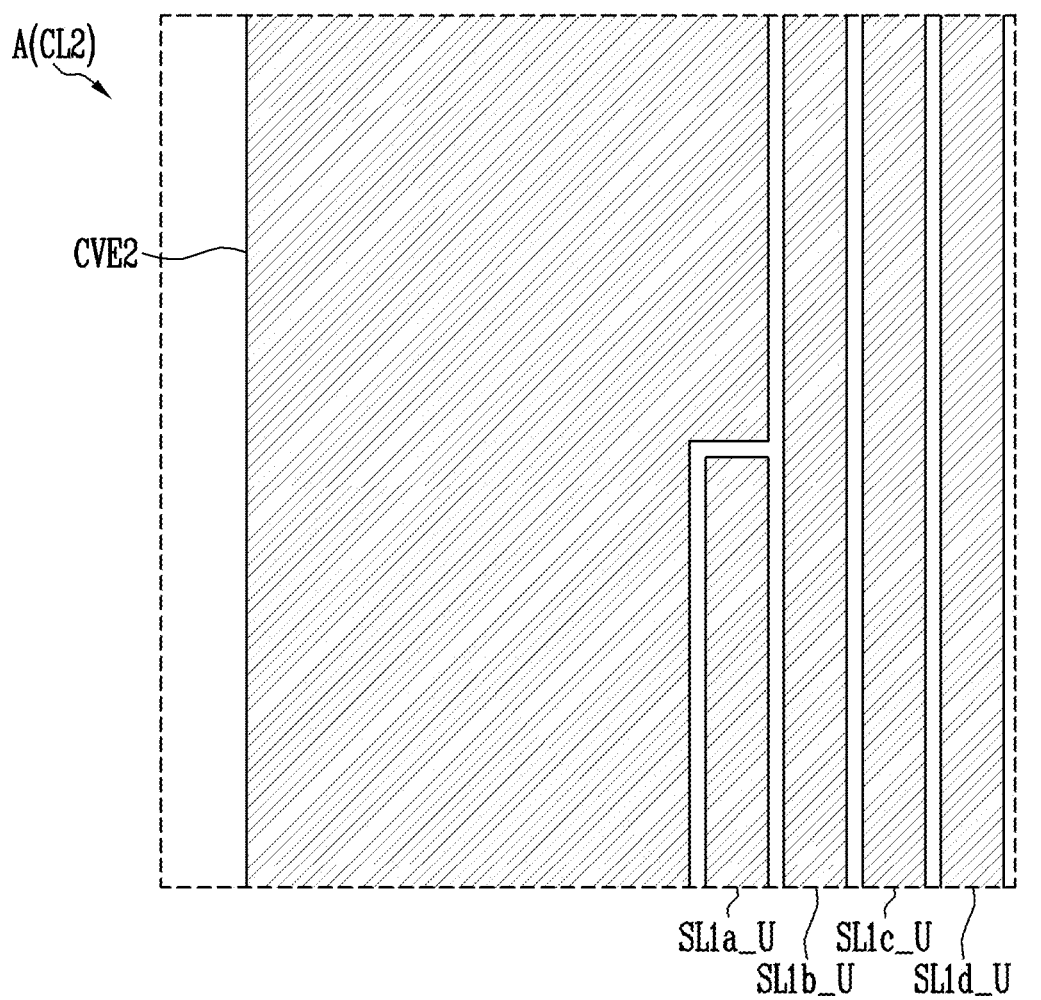
FIG. 11 is a plan view for describing various electrodes and lines implemented with a second conductive layer included in an input-sensing layer of FIG. 5 in an area A of FIG. 6.

FIG. 10 is a plan view for describing various electrodes and lines implemented with the first conductive layer included in the input-sensing layer of FIG. 5 in an area A of FIG. 6, and FIG. 11 is a plan view for describing various electrodes and lines implemented with the second conductive layer included in the input-sensing layer of FIG. 5 in an area A of FIG. 6.

Referring to FIG. 10, the first conductive layer (CL1 in FIG. 5) may include a first constant voltage electrode layer CVE1 and a first transmission line layer SL1_L.

The first constant voltage electrode layer CVE1 may define a constant voltage electrode (CVE in FIG. 6) together with the second constant voltage electrode layer (CVE2 in FIG. 11), which will be described later. The first transmission line layer SL1_L may define a first transmission line (SL1 in FIG. 6) together with the second transmission line layer SL1_U in FIG. 12, which will be described later.

In one or more embodiments, the first constant voltage electrode layer CVE1 may include a first constant voltage electrode pattern CVE1$a$ and a second constant voltage electrode pattern CVE1$b$ located to be spaced apart from each other.

In one or more embodiments, the first transmission line layer SL1_L may include a plurality of first transmission line layers SL1$a$_L, SL1$b$_L, SL1$c$_L, and SL1$d$_L. In this case, the plurality of first transmission line layers SL1$a$_L, SL1$b$_L, SL1$c$_L, and SL1$d$_L may be electrically insulated from each other. Hereinafter, for convenience of description, the description will be made based on the first transmission line layer SL1$a$_L, and the following description for the first transmission line layer SL1a_L may be applied substantially equal to or similar to the first transmission line layers SL1b_L, SL1c_L, and SL1d_L.

The first transmission line layer SL1a_L may include a first extension portion P1 extending in the second direction DR2, and a second extension portion P2 extending in a direction opposite to the first direction DR1 from the first extension portion P1. Here, the second extension portion P2 of the first transmission line layer SL1a_L may extend toward the sensing area (SA in FIG. 6). Accordingly, the second extended portion P2 of the first transmission line layer SL1a_L may be electrically connected to the first sensing electrode TE1 located in the sensing area (SA in FIG. 6).

In this case, as shown in FIGS. 6 and 10, the second extended portion P2 of the first transmission line layer SL1a_L may extend toward the sensing area SA through a space between the first constant voltage electrode pattern CVE1a and the second constant voltage electrode pattern CVE1b. Here, the second extended portion P2 of the first transmission line layer SL1a_L may be spaced apart from each of the first constant voltage electrode pattern CVE1a and the second constant voltage electrode pattern CVE1b.

Referring to FIG. 11, the second conductive layer (CL2 in FIG. 5) may include a second constant voltage electrode layer CVE2 and a second transmission line layer SL1_U.

As described above, the second constant voltage electrode layer CVE2 may define a constant voltage electrode (CVE in FIG. 6) together with the first constant voltage electrode layer (CVE1 in FIG. 10). Additionally, the second transmission line layer SL1_U may define the first transmission line (SL1 in FIG. 6) together with the first transmission line layer (SL1_L in FIG. 10).

In one or more embodiments, the second transmission line layer SL1_U may include a plurality of second transmission line layers SL1a_U, SL1b_U, SL1c_U, and SL1d_U. In this case, the plurality of second transmission line layers SL1a_U, SL1b_U, SL1c_U, and SL1d_U may be electrically insulated from each other.

Figure 12:
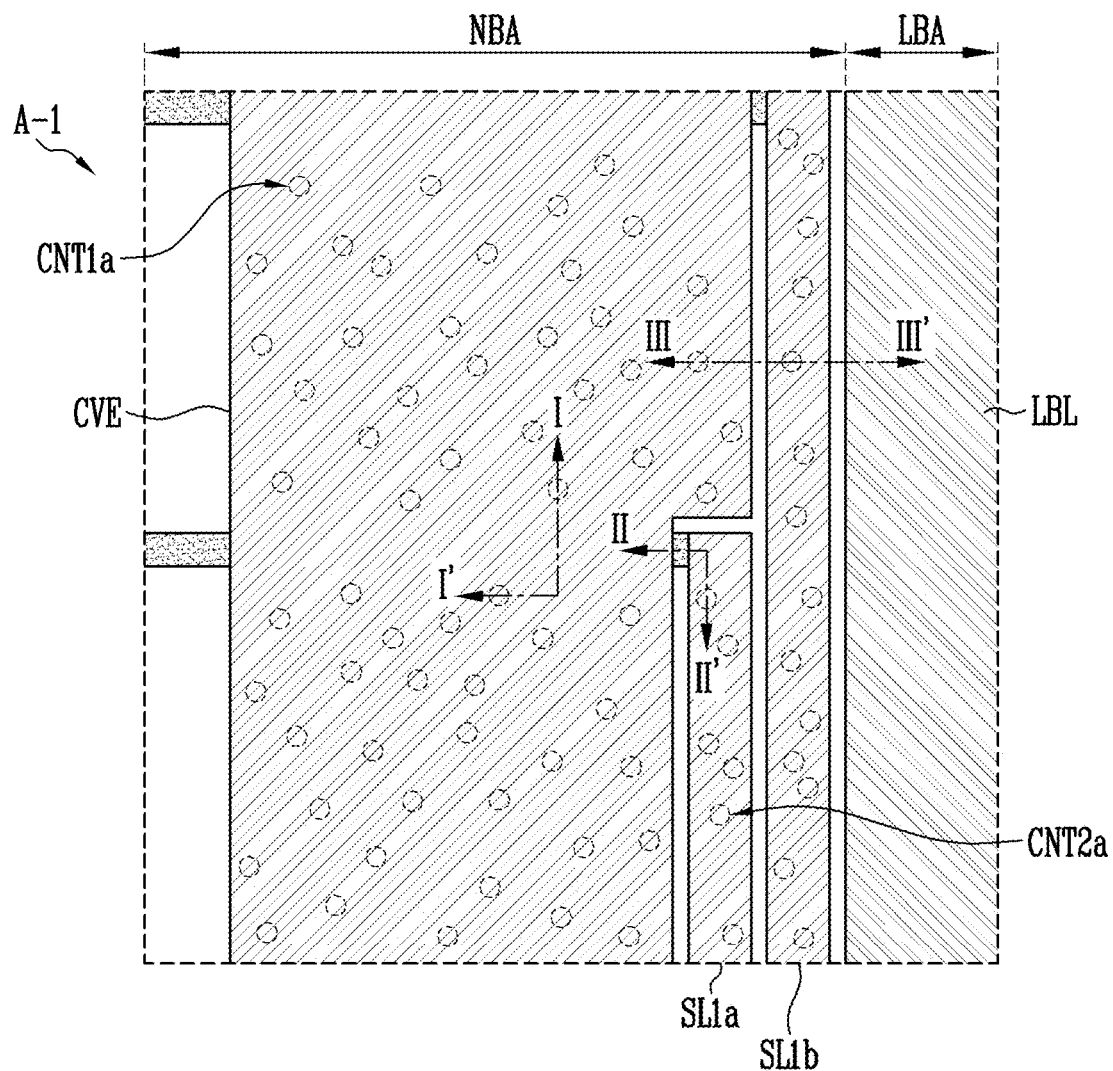
FIG. 12 is an enlarged plan view of an area A of FIG. 6 and is a plan view for describing the first embodiment of the present disclosure.
Figure 12:
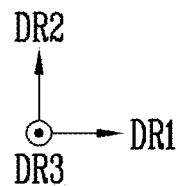
Figure 13:
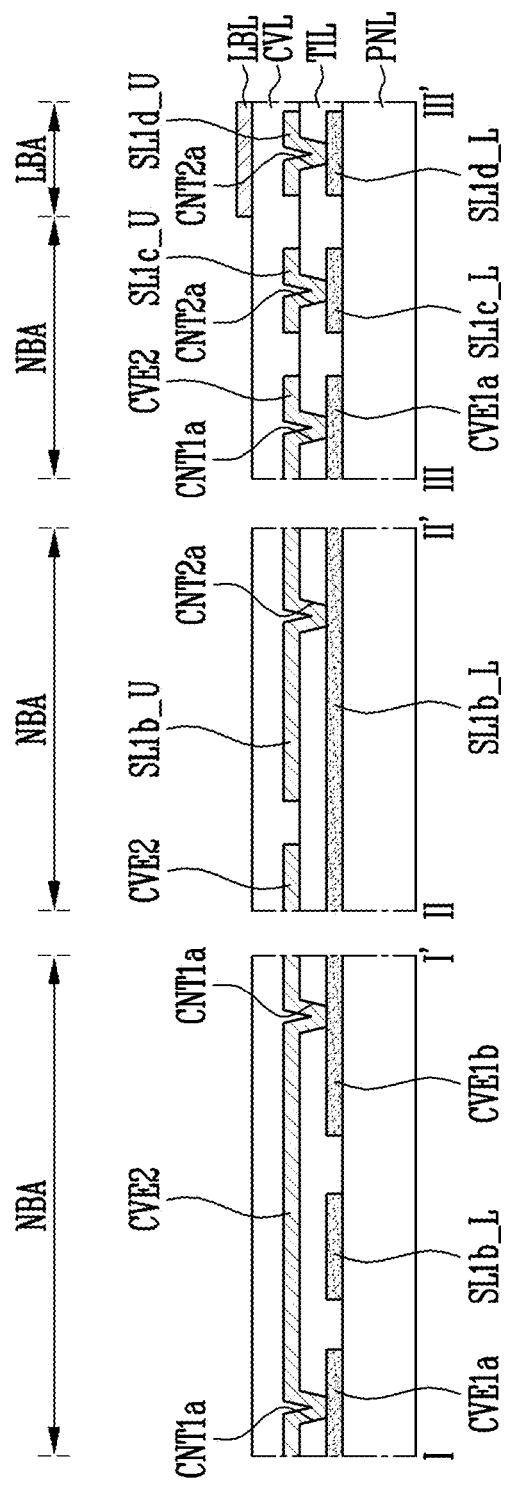
FIG. 13 is a cross-sectional view taken along the lines I-I', II-II', and III-III' of FIG. 12.

FIG. 12 is an enlarged plan view of an area A of FIG. 6 and is a plan view for describing the first embodiment of the present disclosure. FIG. 13 is a cross-sectional view taken along the lines I-I', II-II', and III-III' of FIG. 12.

Referring to FIGS. 12 and 13, the first constant voltage electrode layer CVE1 and the second constant voltage electrode layer CVE2 may electrically contact each other through a plurality of first through holes CNT1a defined in the sensing-insulating layer TIL. For example, each of the first constant voltage electrode pattern CVE1a and the second constant voltage electrode pattern CVE1b may electrically contact each other through a plurality of first through holes CNT1a.

Here, the first constant voltage electrode layer CVE1 and the second constant voltage electrode layer CVE2 electrically contacting each other through the plurality of first through holes CNT1a may define the constant voltage electrode CVE. Meanwhile, because the constant voltage electrode CVE includes two electrode layers CVE1 and CVE2 electrically contacting each other, the resistance of the constant voltage electrode CVE may be relatively low, thereby improving the driving efficiency of the display device DD.

In one or more embodiments, at least a portion of each of the first constant voltage electrode layer CVE1 and the second constant voltage electrode layer CVE2 may be located in the non-light-blocking area NBA. That is, at least a portion of the constant voltage electrode CVE may be located in the non-light-blocking area NBA.

In this case, in the non-light-blocking area NBA, the plurality of first through holes CNT1a may be randomly arranged/located. That is, a distance between two adjacent first through holes CNT1a among the plurality of first through holes CNT1a may not be constant. Accordingly, the interference phenomena that occurs when external light (L1 and L2 in FIG. 1) incident on the non-light-blocking area NBA is reflected and generated by the second constant voltage electrode layer CVE2 located along a cross-sectional profile of the plurality of first through holes CNT1a, may be reduced or minimized.

In one or more embodiments, the plurality of first through holes CNT1a may be circular in a plane view. In one or more embodiments, each of the plurality of first through holes CNT1a may have a circular shape with various diameters. That is, one of the plurality of first through holes CNT1a may have a circular planar shape having a first diameter, and another first through hole CNT1a may have a circular planar shape having a second diameter that is different from the first diameter.

Alternatively, the plurality of first through holes CNT1a may have the same planar shape. For example, each of the plurality of first through holes CNT1a may have a circular planar shape having the first diameter.

In one or more embodiments, a planar area occupied by the plurality of first through holes CNT1a in the non-light-blocking area NBA may be about 0.5% or more and about 10% or less of an area where the first constant voltage electrode layer CVE1 and the second constant voltage electrode layer CVE2 overlap each other in the non-light-blocking area NBA. Here, when the planar area occupied by the plurality of first through holes CNT1a satisfies the above-mentioned range, sufficient contact may be made between the first constant voltage electrode layer CVE1 and the second constant voltage electrode layer CVE2, so that not only the constant voltage electrode layer CVE ensures a sufficiently low resistance, but also so that the interference phenomenon caused by external light (L1 and L2 in FIG. 1) may be reduced or minimized.

Meanwhile, the first transmission line layer SL1_L and the second transmission line layer SL1_U may electrically contact each other through a plurality of second through holes CNT2a defined in the sensing-insulating layer TIL. For example, the first transmission line layers SL1a_L, SL1b_L, SL1c_L, and SL1d_L may respectively electrically contact the second transmission line layers SL1a_U, SL1b_U, SL1c_U, and SL1d_U overlapping in a plane view through the plurality of second through holes CNT2a.

Here, the first transmission line layer SL1_L and the second transmission line layer SL1_U, which electrically contact each other through the plurality of second through holes CNT2a, may define the first transmission line SL1. Meanwhile, because the first transmission line SL1 includes two transmission line layers SL1_L and SL1_U electrically contacting each other, the resistance of the first transmission line SL1 may be relatively low, thereby improving the driving efficiency of the display device DD.

In one or more embodiments, at least a portion of each of the first and second transmission line layers SL1_L and SL1_U may be located in the non-light-blocking area NBA. That is, at least a portion of the first transmission line SL1 may be located in the non-light-blocking area NBA. For example, each of a first transmission line SL1a defined by the first transmission line layer SL1a_L and the second transmission line layer SL1a_U electrically contacting each other through a plurality of second through holes CNT2a, and a second transmission line SL1b defined by the first transmission line layer SL1b_L and the second transmission line layer SL1b_U electrically contacting each other through the plurality of second through holes CNT2a, may be located in the non-light-blocking area NBA.

In this case, in the non-light-blocking area NBA, the plurality of second through holes CNT2a may be randomly located. That is, a distance between two adjacent second through holes CNT2a among the plurality of second through holes CNT2a may not be constant. Accordingly, the interference phenomena that occurs when external light (L1 and L2 in FIG. 1) incident on the non-light-blocking area NBA is reflected and generated by the second transmission line layer SL1_U located along a cross-sectional profile of the plurality of second through holes CNT2a, may be reduced or minimized.

In one or more embodiments, the plurality of second through holes CNT2a may be circular in a plane view. In one or more embodiments, each of the plurality of second through holes CNT2a may have a circular shape with various diameters. That is, one of the plurality of second through holes CNT2a may have a circular planar shape having a third diameter, and another second through hole CNT2a may have a circular planar shape having a fourth diameter that is different from the third diameter.

Alternatively, the plurality of second through holes CNT2a may have the same planar shape. For example, each of the plurality of second through holes CNT2a may have a circular planar shape having the third diameter.

In one or more embodiments, a planar area occupied by the plurality of second through holes CNT2a in the non-light-blocking area NBA may be about 0.5% or more and about 10% or less of an area where the first transmission line layer SL1_L and the second transmission line layer SL1_U overlap each other in the non-light-blocking area NBA. Here, when the planar area occupied by the plurality of second through holes CNT2a satisfies the above-mentioned range, sufficient contact may be made between the first transmission line layer SL1_L and the second transmission line layer SL1_U, so that not only the transmission line SL1 ensures a sufficiently low resistance, but also so that the interference phenomenon caused by external light (L1 and L2 in FIG. 1) may be reduced or minimized.

In one or more embodiments, as shown in FIGS. 12 and 13, each of the first transmission line layer SL1_L and the second transmission line layer SL1_U may be electrically insulated from the first constant voltage electrode layer CVE1 and the second constant voltage electrode layer CVE2.

Hereinafter, various embodiments of the present disclosure will be described with reference to FIGS. 14 to 19. Here, because various embodiments of the present disclosure shown in FIGS. 14 to 19 have a difference only in the planar shape and/or planar arrangement of each of a plurality of first through holes and/or a plurality of second through holes when compared to the first embodiment of the present disclosure described with reference to FIGS. 12 to 13, the description of overlapping content will be omitted below.

Figure 14:
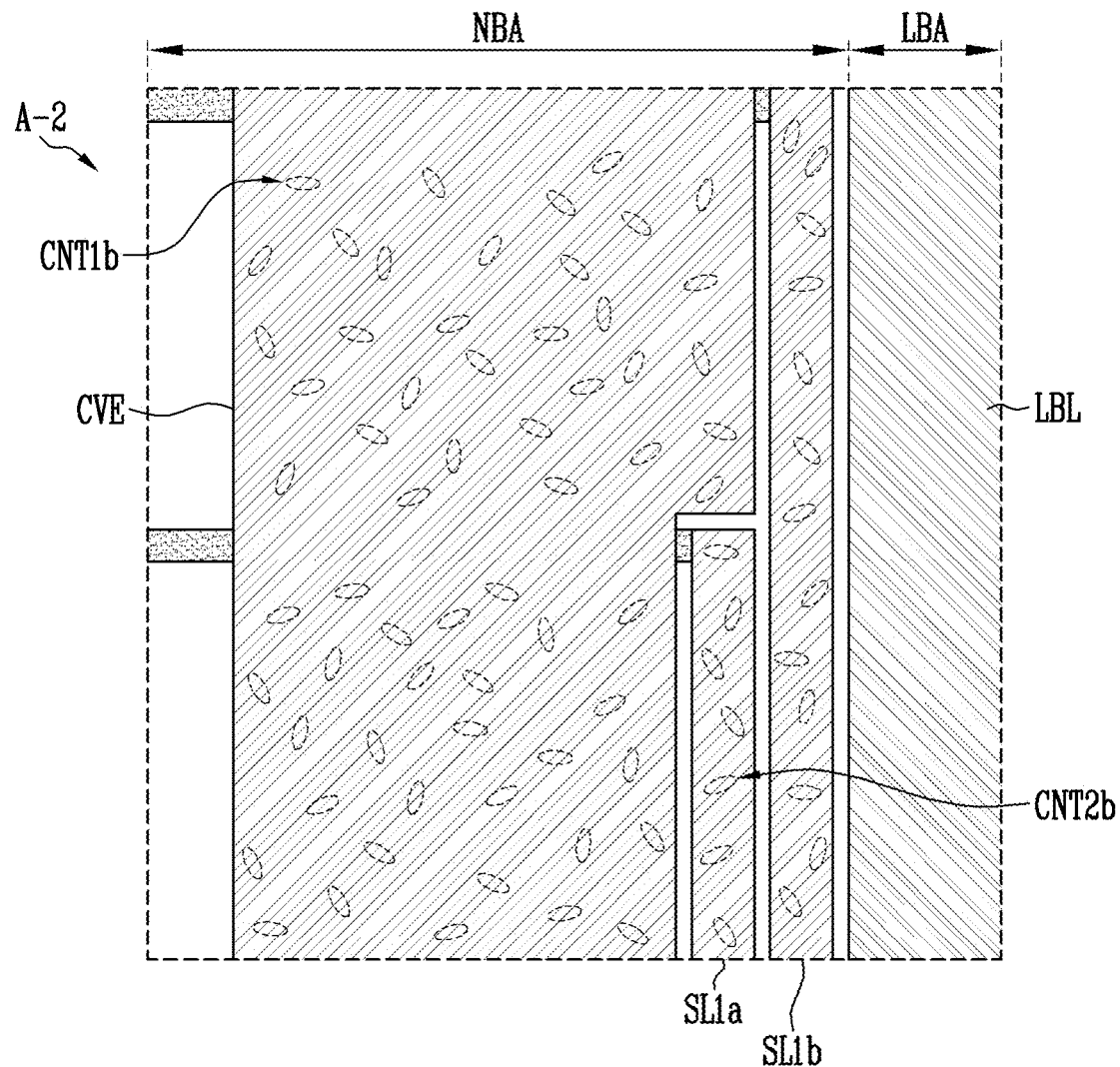
FIG. 14 is an enlarged plan view of an area A of FIG. 6 and is a plan view for describing the second embodiment of the present disclosure.
Figure 14:
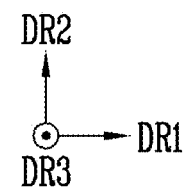

FIG. 14 is an enlarged plan view of an area A of FIG. 6 and is a plan view for describing one or more second embodiments of the present disclosure.

Referring to FIG. 14, the first constant voltage electrode layer CVE1 and the second constant voltage electrode layer CVE2 may electrically contact each other through the plurality of first through holes CNT1b, and the first transmission line layer SL1_L and the second transmission line layer SL1_U may electrically contact each other through the plurality of second through holes CNT2b.

In one or more embodiments, the plurality of first through holes CNT1b may be randomly located in a plane view. In this case, a planar area occupied by the plurality of first through holes CNT1b in the non-light-blocking area NBA may be about 0.5% or more and about 10% or less of an area where the first constant voltage electrode layer CVE1 and the second constant voltage electrode layer CVE2 overlap each other in the non-light-blocking area NBA.

In one or more embodiments, the plurality of first through holes CNT1b may have an oval shape in a plane view. In this case, the interference phenomenon caused by external light (L1 and L2 in FIG. 1) may be more effectively suppressed.

Meanwhile, unlike shown in FIG. 14, the plurality of first through holes CNT1b may be polygonal in a plane view. In this case as well, the interference phenomenon caused by external light (L1 and L2 in FIG. 1) may be more effectively suppressed.

In one or more embodiments, when the plurality of first through holes CNT1b are oval in a plane view, a long axis direction of the oval may be randomly aligned along the plurality of first through holes CNT1b.

In one or more embodiments, the plurality of second through holes CNT2b may be randomly located in a plane view. In this case, a planar area occupied by the plurality of second through holes CNT2b in the non-light-blocking area NBA may be about 0.5% or more and about 10% or less of an area where the first transmission line layer SL1_L and the second transmission line layer SL1_U overlap each other in the non-light-blocking area NBA.

In one or more embodiments, the plurality of second through holes CNT2b may be oval in a plane view. In this case, the long axis direction of the oval may be randomly aligned along the plurality of second through holes CNT2b.

Meanwhile, unlike shown in FIG. 14, the plurality of second through holes CNT2b may be polygonal in a plane view. In this case, the interference phenomenon caused by external light (L1 and L2 in FIG. 1) may be more effectively suppressed.

Figure 15:
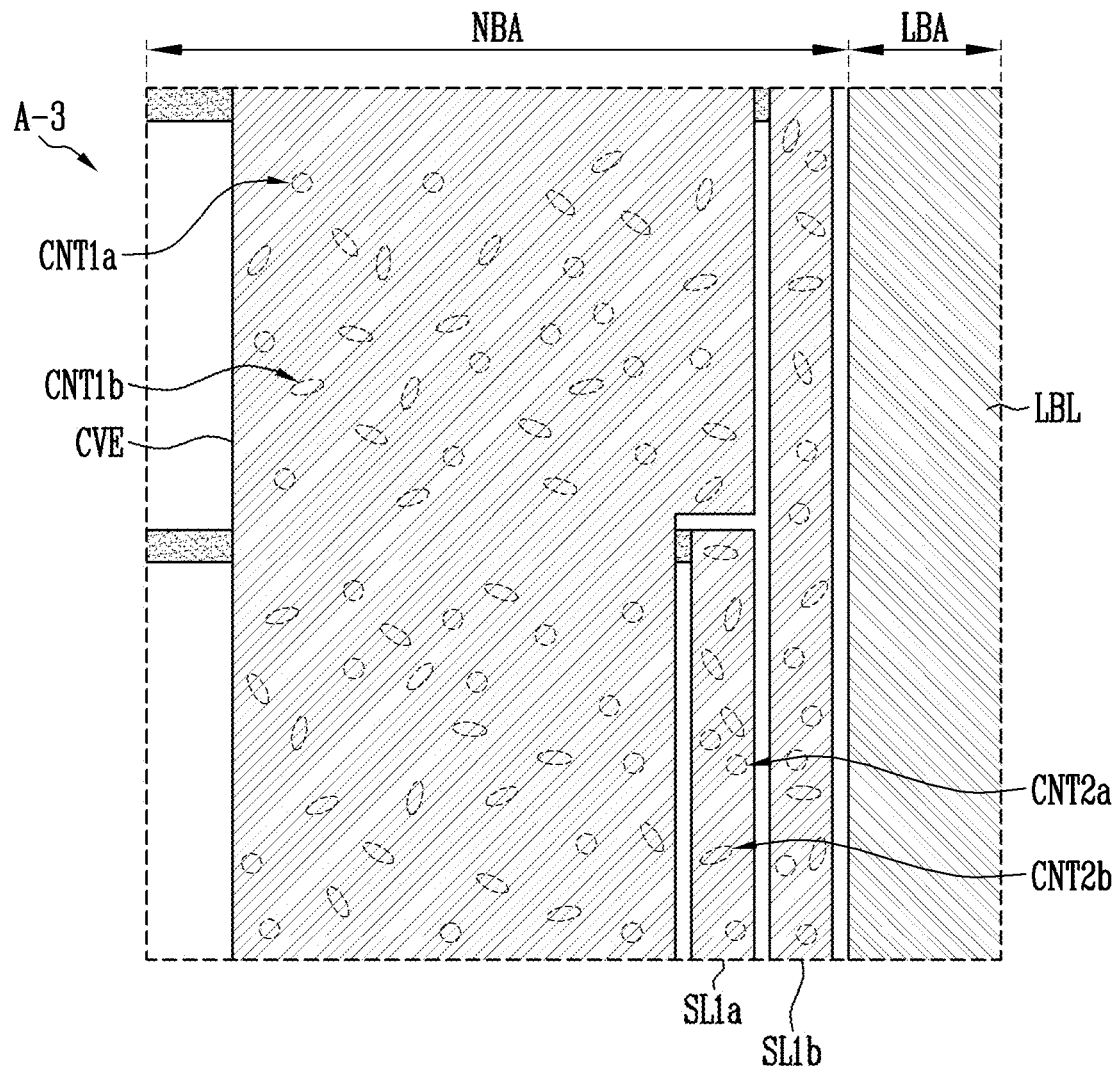
FIG. 15 is an enlarged plan view of an area A of FIG. 6 and is a plan view for describing the third embodiment of the present disclosure.

FIG. 15 is an enlarged plan view of an area A of FIG. 6 and is a plan view for describing the third embodiment of the present disclosure.

Referring to FIG. 15, the first constant voltage electrode layer CVE1 and the second constant voltage electrode layer CVE2 may electrically contact each other through the plurality of first through holes CNT1a and CNT1b, and the first transmission line layer SL1_L and the second transmission line layer SL1_U may electrically contact each other through the plurality of second through holes CNT2a and CNT2b.

In one or more embodiments, the plurality of first through holes CNT1a and CNT1b may be randomly located in a plane view. In this case, a planar area occupied by the plurality of first through holes CNT1a, and CNT1b in the non-light-blocking area NBA may be about 0.5% or more and about 10% or less of an area where the first constant voltage electrode layer CVE1 and the second constant voltage electrode layer CVE2 overlap each other in the non-light-blocking area NBA.

In one or more embodiments, the first through holes CNT1a and CNT1b may include various types of through holes having different shapes in a plane view. For example, as shown in FIG. 15, the first through holes CNT1a and CNT1b may include the first through holes CNT1a having a circular shape in a plane view, and the first through holes CNT1b having an oval shape in a plane view.

However, the above-described content is an example, and unlike what is shown in FIG. 15, the first through holes CNT1*a* and CNT1*b* may include at least two or more selected from the group consisting of a through hole having a circular shape in a plane view, a through hole having an oval shape in a plane view, and/or a through hole having a polygonal shape in a plane view.

In one or more embodiments, the plurality of second through holes CNT2*a* and CNT2*b* may be randomly located in a plane view. In this case, a planar area occupied by the plurality of second through holes CNT2*a* and CNT2*b* in the non-light-blocking area NBA may be about 0.5% or more and about 10% or less of an area where the first transmission line layer SL1_L and the second transmission line layer SL1_U overlap each other in the non-light-blocking area NBA.

In one or more embodiments, the second through holes CNT2*a* and CNT2*b* may include various types of through holes having different shapes in a plane view. For example, as shown in FIG. 15, the second through holes CNT2*a* and CNT2*b* may include the second through holes CNT2*a* having a circular shape in a plane view, and the second through holes CNT2*b* having an oval shape in a plane view.

However, the above-described content is an example, and unlike what is shown in FIG. 15, the second through holes CNT2*a* and CNT2*b* may include at least two or more selected from the group consisting of a through hole having a circular shape in a plane view, a through hole having an oval shape in a plane view, and/or a through hole having a polygonal shape in a plane view.

Figure 16:
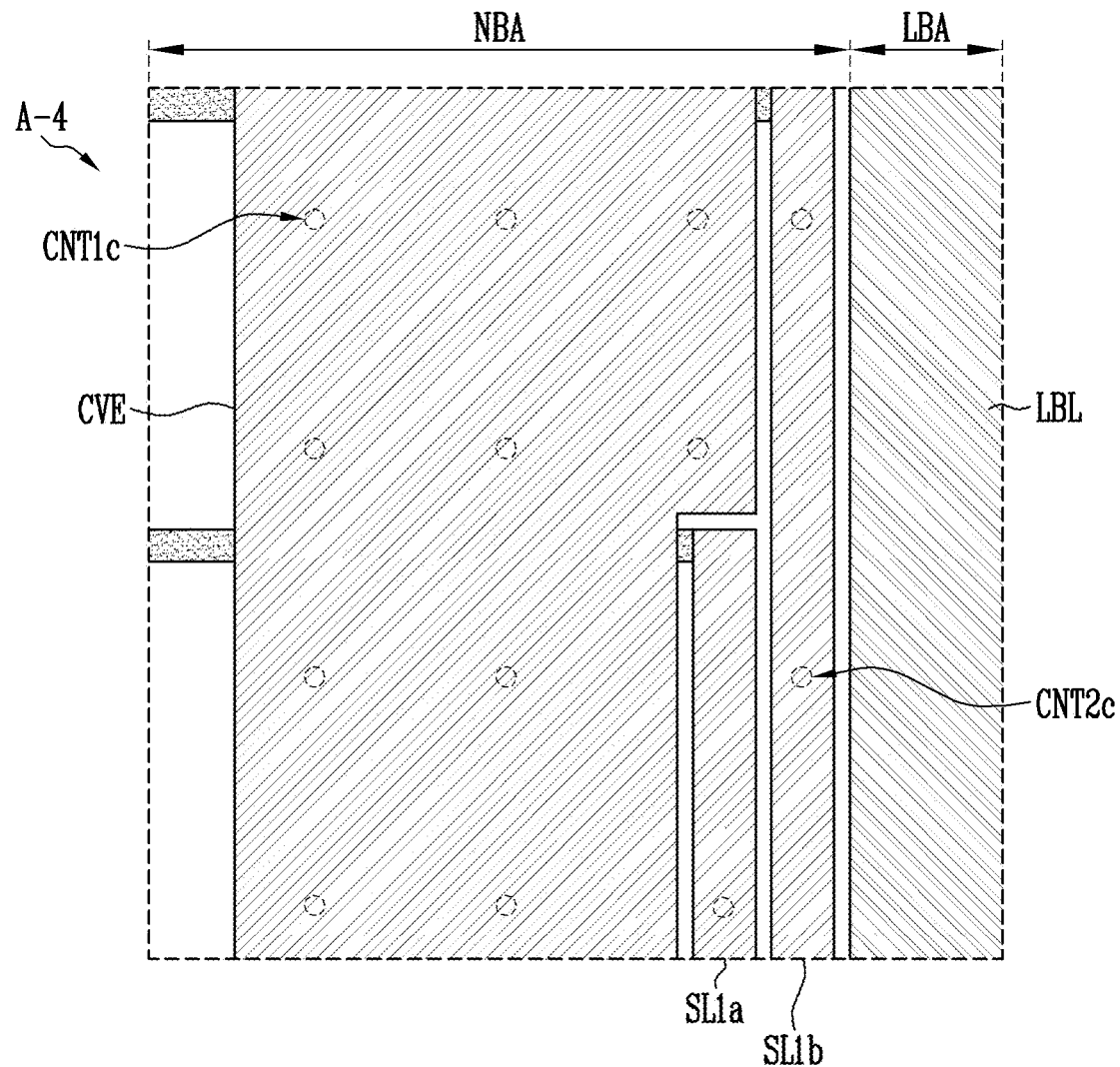
FIG. 16 is an enlarged plan view of an area A of FIG. 6 and is a plan view for describing the fourth embodiment of the present disclosure.
Figure 16:
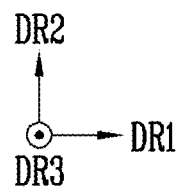

FIG. 16 is an enlarged plan view of an area A of FIG. 6, and is a plan view for describing the fourth embodiment of the present disclosure.

Referring to FIG. 16, the first constant voltage electrode layer CVE1 and the second constant voltage electrode layer CVE2 may electrically contact each other through the plurality of first through holes CNT1*c*, and the first transmission line layer SL1_L and the second transmission line layer SL1_U may electrically contact each other through the plurality of second through holes CNT2*c*.

In one or more embodiments, the plurality of first through holes CNT1*c* may be arranged according to a corresponding rule in a plane view. For example, a separation distance between two adjacent first through holes among the plurality of first through holes CNT1*c* may be substantially constant.

In one or more embodiments, an area occupied by the plurality of first through holes CNT1*c* in the non-light-blocking area NBA may be about 0.5% or more and about 5% or less of an area where the first constant voltage electrode layer CVE1 and the second constant voltage electrode layer CVE2 overlap each other in the non-light-blocking area NBA. In this way, regardless of the arrangement form of the plurality of first through holes CNT1*c* in a plane view, the density of the plurality of first through holes CNT1*c* may be relatively low, thereby reducing or minimizing the interference phenomenon caused by external light (L1 and L2 in FIG. 1).

In one or more embodiments, the plurality of first through holes CNT1*c* may be circular in a plane view. In one or more embodiments, each of the plurality of first through holes CNT1*c* may have a circular shape with various diameters. That is, one of the plurality of first through holes CNT1*c* may have a circular planar shape having a first diameter, and another first through hole CNT1*c* may have a circular planar shape having a second diameter that is different from the first diameter.

Alternatively, the plurality of first through holes CNT1*c* may have the same planar shape. For example, each of the plurality of first through holes CNT1*c* may have a circular planar shape having the first diameter.

In one or more embodiments, the plurality of second through holes CNT2*c* may also be arranged according to a corresponding rule in a plane view. For example, a separation distance between two adjacent second through holes among the plurality of second through holes CNT2*c* may be substantially constant.

In one or more embodiments, an area occupied by the plurality of second through holes CNT2*c* in the non-light-blocking area NBA may be about 0.5% or more and about 5% or less of an area where the first transmission line layer SL1_L and the second transmission line layer SL1_U overlap each other in the non-light-blocking area NBA. In this way, regardless of the arrangement form of the plurality of second through holes CNT2*c* in a plane view, the density of the plurality of second through holes CNT2*c* may be relatively low, thereby reducing or minimizing the interference phenomenon caused by external light (L1 and L2 in FIG. 1).

In one or more embodiments, the plurality of second through holes CNT2*c* may be circular in a plane view. In one or more embodiments, each of the plurality of second through holes CNT2*c* may have a circular shape with various diameters. That is, one of the plurality of second through holes CNT2*c* may have a circular planar shape having a third diameter, and another second through hole CNT2*c* may have a circular planar shape having a fourth diameter that is different from the third diameter.

Alternatively, the plurality of second through holes CNT2*c* may have the same planar shape. For example, each of the plurality of second through holes CNT2*c* may have a circular planar shape having the third diameter.

Figure 17:
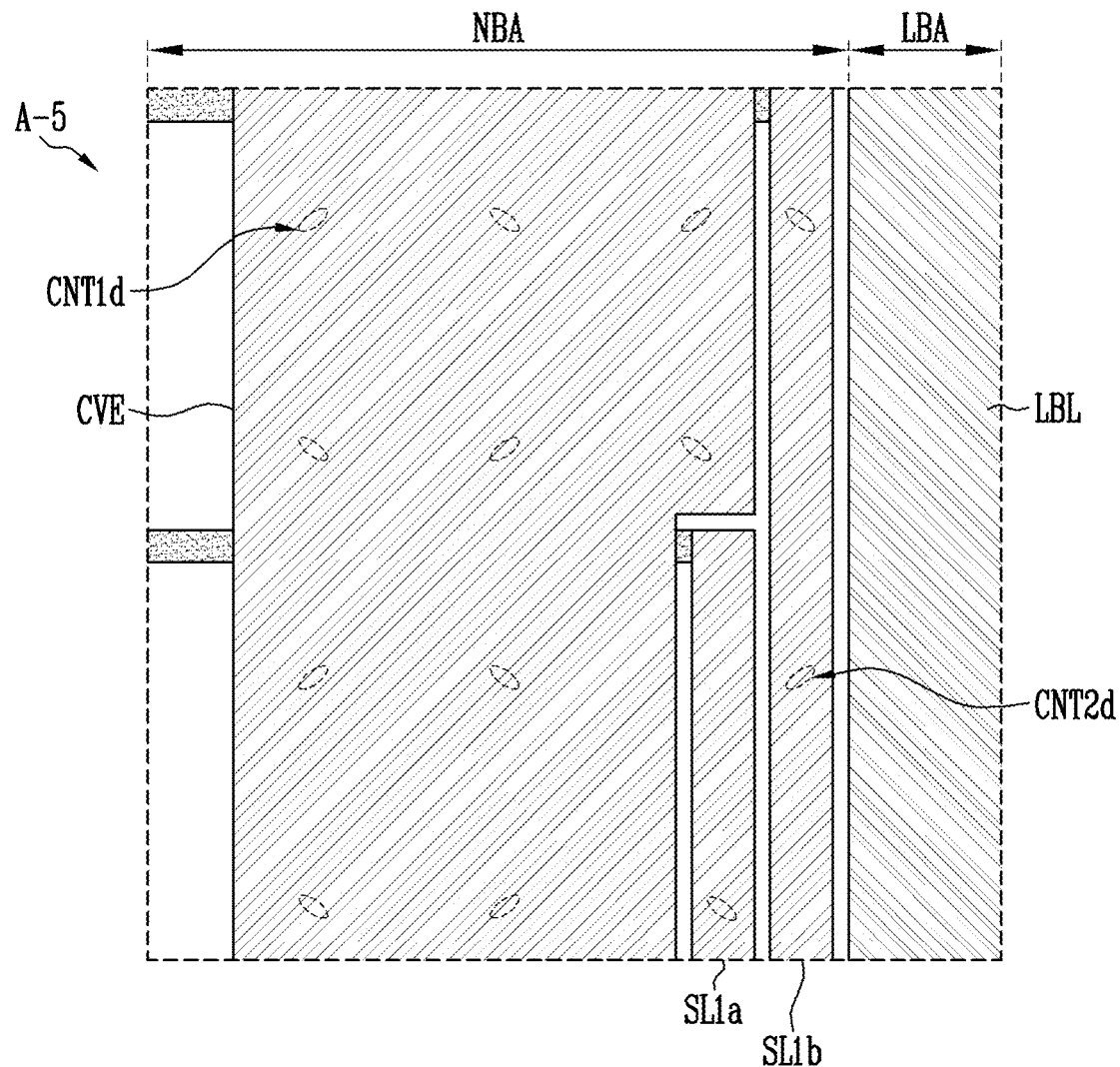
FIG. 17 is an enlarged plan view of an area A of FIG. 6 and is a plan view for describing the fifth embodiment of the present disclosure.
Figure 17:
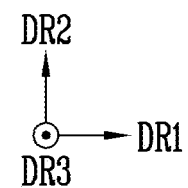

FIG. 17 is an enlarged plan view of an area A of FIG. 6 and is a plan view for describing the fifth embodiment of the present disclosure.

Referring to FIG. 17, the first constant voltage electrode layer CVE1 and the second constant voltage electrode layer CVE2 may electrically contact each other through the plurality of first through holes CNT1*d*, and the first transmission line layer SL1_L and the second transmission line layer SL1_U may electrically contact each other through the plurality of second through holes CNT2*d*.

In one or more embodiments, the plurality of first through holes CNT1*d* may be located/arranged according to a corresponding rule in a plane view.

In one or more embodiments, an area occupied by the plurality of first through holes CNT1*d* in the non-light-blocking area NBA may be about 0.5% or more and about 5% or less of an area where the first constant voltage electrode layer CVE1 and the second constant voltage electrode layer CVE2 overlap each other in the non-light-blocking area NBA. In this way, regardless of the arrangement form of the plurality of first through holes CNT1*d* in a plane view, the density of the plurality of first through holes CNT1*d* may be relatively low, thereby reducing or minimizing the interference phenomenon caused by external light (L1 and L2 in FIG. 1).

In one or more embodiments, the plurality of first through holes CNT1*d* may have an oval shape in a plane view. In this case, the interference phenomenon caused by external light (L1 and L2 in FIG. 1) may be more effectively suppressed.

Meanwhile, unlike shown in FIG. 17, the plurality of first through holes CNT1*d* may be polygonal in a plane view. In this case, the interference phenomenon caused by external light (L1 and L2 in FIG. 1) may be more effectively suppressed.

In one or more embodiments, when the plurality of first through holes CNT1d are oval in a plane view, a long axis direction of the oval may be randomly aligned along the plurality of first through holes CNT1d.

In one or more embodiments, the plurality of second through holes CNT2d may also be arranged according to a corresponding rule in a plane view. For example, a separation distance between two adjacent second through holes among the plurality of second through holes CNT2d may be substantially constant.

In one or more embodiments, an area occupied by the plurality of second through holes CNT2d in the non-light-blocking area NBA may be about 0.5% or more and about 5% or less of an area where the first constant voltage electrode layer CVE1 and the second constant voltage electrode layer CVE2 overlap each other in the non-light-blocking area NBA. In this way, regardless of the arrangement form of the plurality of second through holes CNT2d in a plane view, the density of the plurality of second through holes CNT2d may be relatively low, thereby reducing or minimizing the interference phenomenon caused by external light (L1 and L2 in FIG. 1).

In one or more embodiments, the plurality of second through holes CNT2d may be oval in a plane view. In this case, the interference phenomenon caused by external light (L1 and L2 in FIG. 1) may be more effectively suppressed.

Meanwhile, unlike shown in FIG. 17, the plurality of second through holes CNT2d may be polygonal in a plane view. In this case, the interference phenomenon caused by external light (L1 and L2 in FIG. 1) may be more effectively suppressed.

In one or more embodiments, when the plurality of second through holes CNT2d are oval in a plane view, directions of long axes of the ovals of the plurality of second through holes CNT2d may be randomly aligned.

Figure 18:
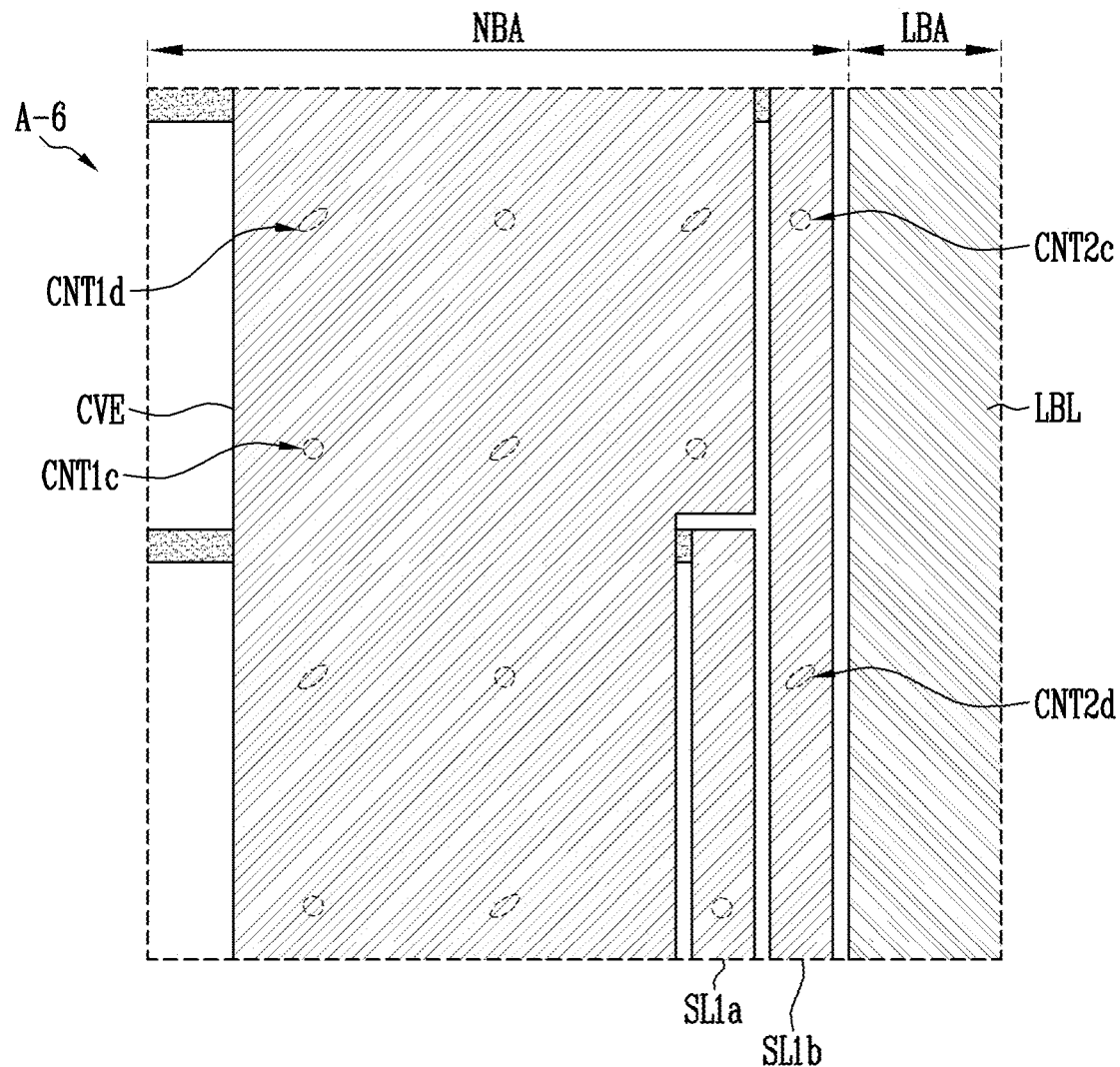
FIG. 18 is an enlarged plan view of an area A of FIG. 6 and is a plan view for describing the sixth embodiment of the present disclosure.

FIG. 18 is an enlarged plan view of an area A of FIG. 6 and is a plan view for describing the sixth embodiment of the present disclosure.

Referring to FIG. 18, the first constant voltage electrode layer CVE1 and the second constant voltage electrode layer CVE2 may electrically contact each other through the plurality of first through holes CNT1c and CNT1d, and the first transmission line layer SL1_L and the second transmission line layer SL1_U may electrically contact each other through the plurality of second through holes CNT2c and CNT2d.

In one or more embodiments, the plurality of first through holes CNT1c and CNT1d may be arranged according to a corresponding rule in a plane view. In this case, a planar area occupied by the plurality of first through holes CNT1c, and CNT1d in the non-light-blocking area NBA may be about 0.5% or more and about 5% or less of an area where the first constant voltage electrode layer CVE1 and the second constant voltage electrode layer CVE2 overlap each other in the non-light-blocking area NBA.

In one or more embodiments, the plurality of first through holes CNT1c and CNT1d may include various types of through holes having different shapes in a plane view. For example, as shown in FIG. 18, the first through holes CNT1c and CNT1d may include the first through holes CNT1c having a circular shape in a plane view and the first through holes CNT1d having an oval shape in a plane view.

However, the above-described content is an example, and unlike what is shown in FIG. 18, the first through holes CNT1c and CNT1d may include at least two or more selected from the group consisting of a through hole having a circular shape in a plane view, a through hole having an oval shape in a plane view, and/or a through hole having a polygonal shape in a plane view.

In one or more embodiments, the plurality of second through holes CNT2c and CNT2d may be arranged according to a corresponding rule in a plane view. In this case, a planar area occupied by the plurality of second through holes CNT2c and CNT2d in the non-light-blocking area NBA may be about 0.5% or more and about 5% or less of an area where the first transmission line layer SL1_L and the second transmission line layer SL1_U overlap each other in the non-light-blocking area NBA.

In one or more embodiments, the plurality of second through holes CNT2c and CNT2d may include various types of through holes having different shapes in a plane view. For example, as shown in FIG. 18, the second through holes CNT2c and CNT2d may include the second through holes CNT2c having a circular shape in a plane view and the second through holes CNT2d having an oval shape in a plane view.

However, the above-described content is an example, and unlike what is shown in FIG. 18, the second through holes CNT2c and CNT2d may include at least two or more selected from the group consisting of a through hole having a circular shape in a plane view, a through hole having an oval shape in a plane view, and/or a through hole having a polygonal shape in a plane view.

Figure 19:
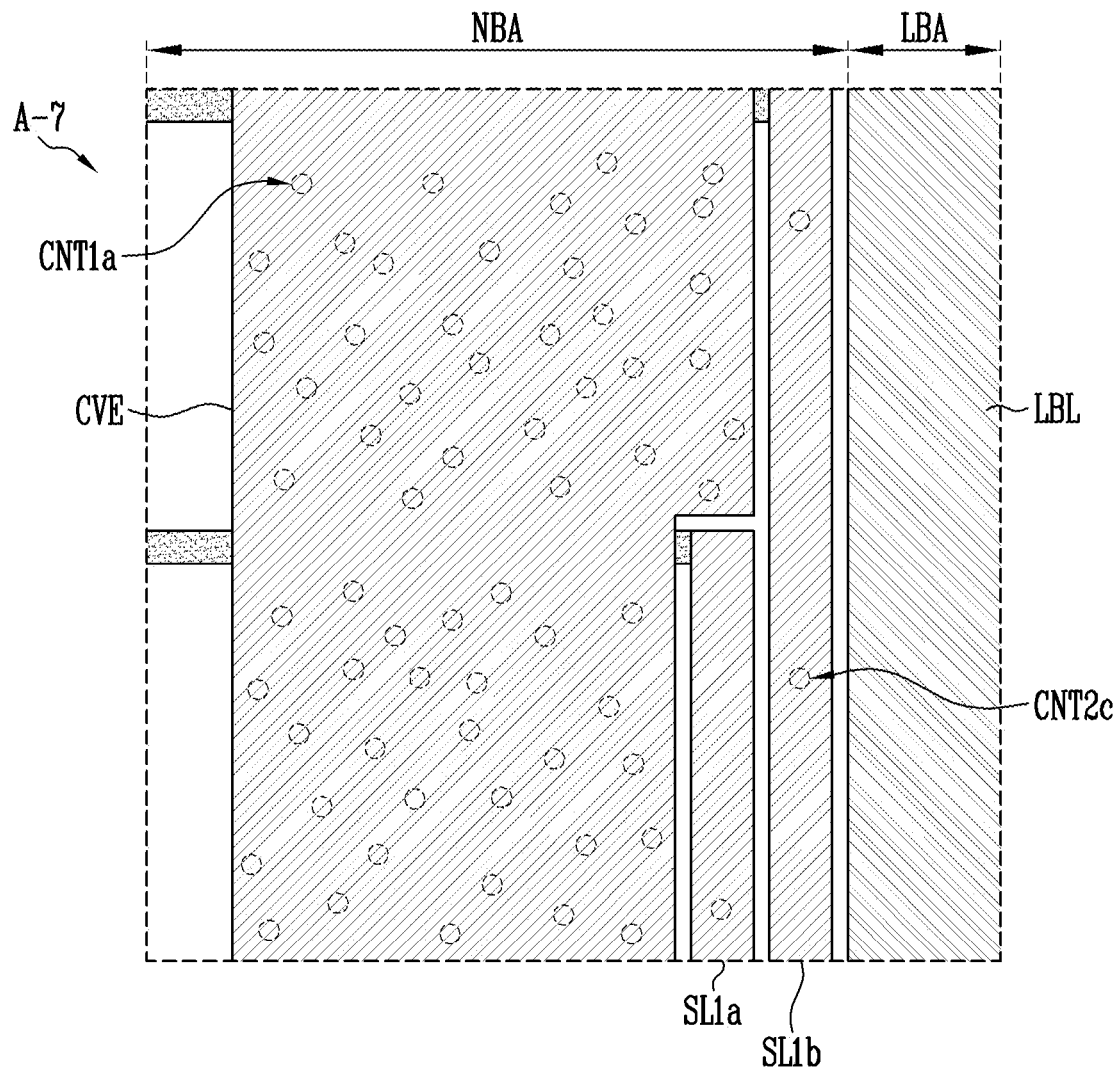
FIG. 19 is an enlarged plan view of an area A of FIG. 6 and is a plan view for describing the seventh embodiment of the present disclosure.

FIG. 19 is an enlarged plan view of an area A of FIG. 6 and is a plan view for describing the seventh embodiment of the present disclosure.

Referring to FIG. 19, the first constant voltage electrode layer CVE1 and the second constant voltage electrode layer CVE2 may electrically contact each other through the plurality of first through holes CNT1a, and the first transmission line layer SL1_L and the second transmission line layer SL1_U may electrically contact each other through the plurality of second through holes CNT2c.

Here, the plurality of first through holes CNT1a may be substantially the same as the plurality of first through holes CNT1a described with reference to FIG. 12, and the plurality of second through holes CNT2c may be substantially the same as the plurality of second through holes CNT2c described with reference to FIG. 16. Therefore, the repeated description of overlapping content will be omitted.

Figure 20:
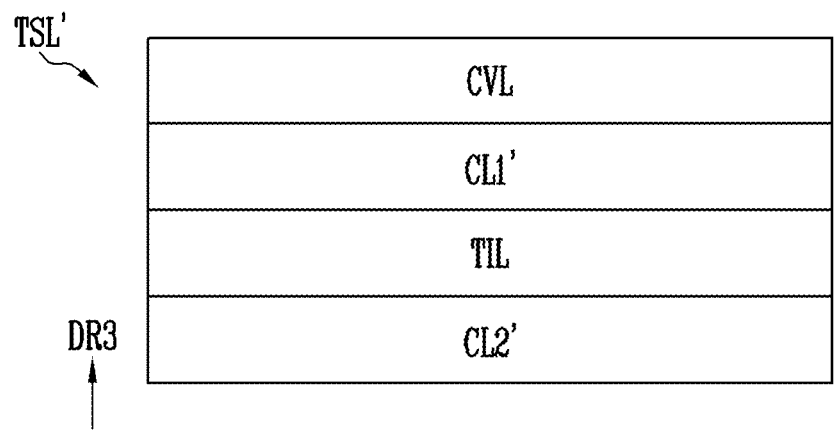
FIG. 20 is a drawing for describing other embodiment of the input-sensing layer included in the display device of FIG. 1.

FIG. 20 is a drawing for describing the other embodiment of the input-sensing layer included in the display device of FIG. 1.

Referring to FIG. 20, the input-sensing layer TSL' may include a second conductive layer CL2', a sensing-insulating layer TIL, a first conductive layer CL1', and a cover layer CVL. The second conductive layer CL2', the sensing-insulating layer TIL, the first conductive layer CL1', and the cover layer CVL may be sequentially stacked in the third direction DR3.

Here, the second conductive layer CL2' may be substantially the same as the second conductive layer CL2 described with reference to FIG. 5, except that it is located under the sensing-insulating layer TIL, and thus, it may include components that are substantially the same as or similar to various components included in the second conductive layer CL2 described with reference to FIGS. 6 to 19.

Likewise, the first conductive layer CL1' may be substantially the same as the first conductive layer CL1 described with reference to FIG. 5, except that it is located on the sensing-insulating layer TIL, and thus, it may include components that are substantially the same as or similar to various components included in the first conductive layer CL1 described with reference to FIGS. 6 to 19.

Figure 21:
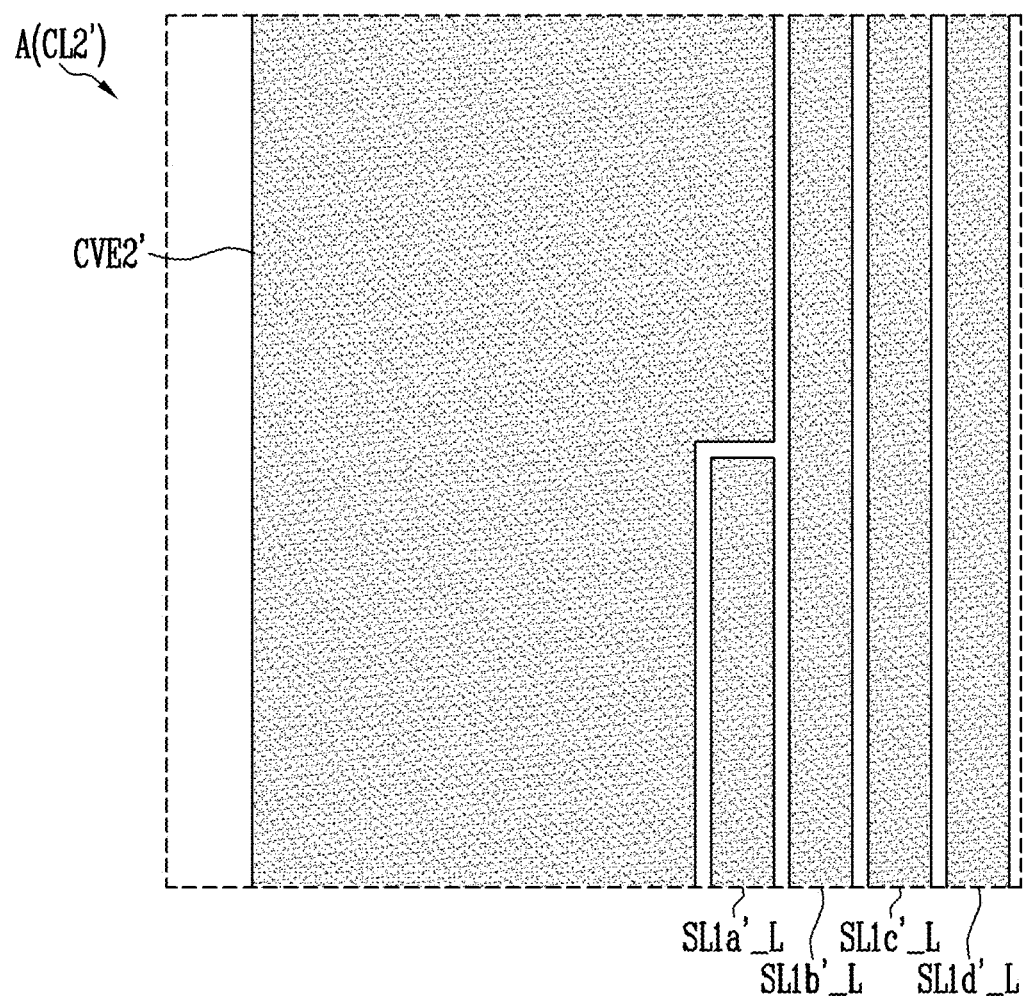
FIG. 21 is a plan view for describing various electrodes and lines implemented with a second conductive layer included in an input-sensing layer of FIG. 20 in an area A of FIG. 6.
Figure 21:
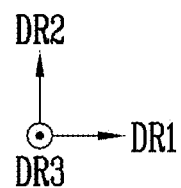
Figure 22:
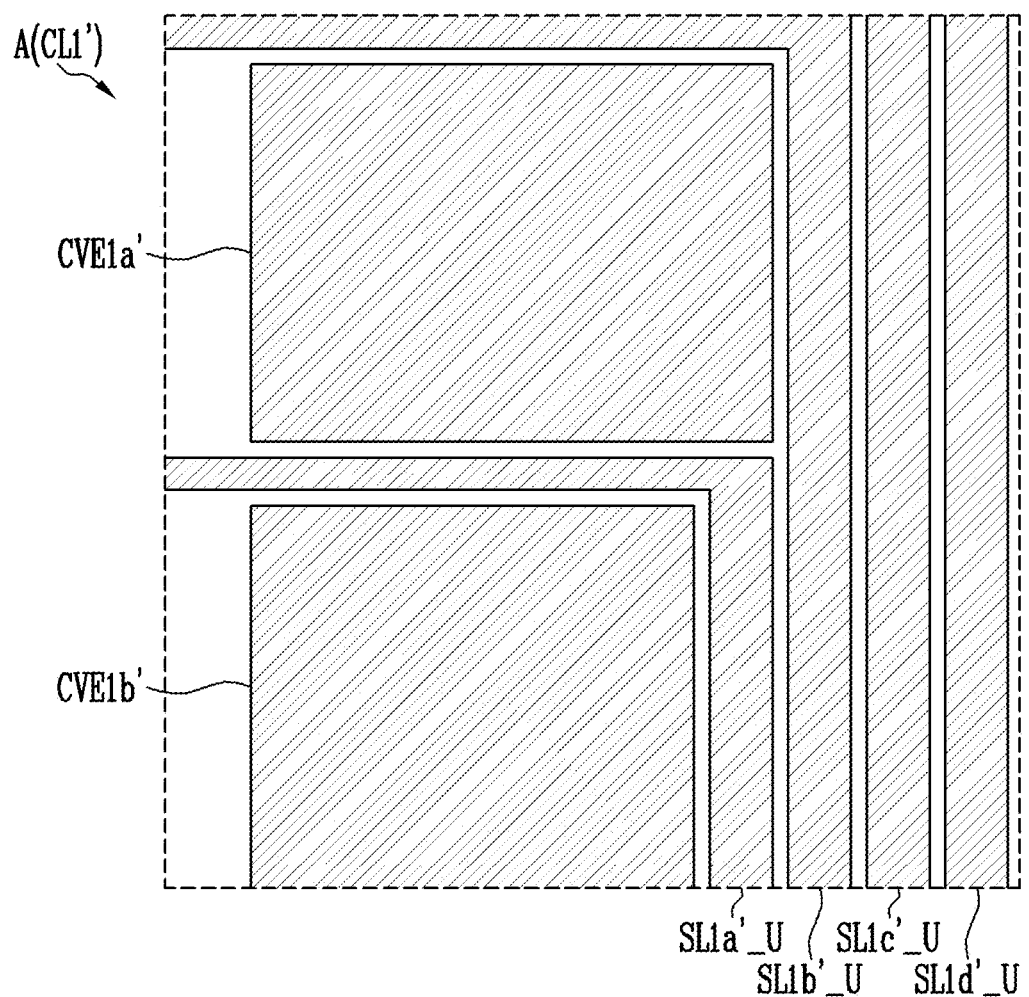
FIG. 22 is a plan view for describing various electrodes and lines implemented with a first conductive layer included in an input-sensing layer of FIG. 20 in an area A of FIG. 6.

FIG. 21 is a plan view for describing various electrodes and lines implemented with the second conductive layer included in the input-sensing layer of FIG. 20 in an area A of FIG. 6, and FIG. 22 is a plan view for describing various electrodes and lines implemented with the first conductive layer included in the input-sensing layer of FIG. 20 in an area A of FIG. 6.

Referring to FIG. 21, the second conductive layer CL2' may include a second constant voltage electrode layer CVE2' and a second transmission line layer SL1'_L.

Here, the second constant voltage electrode layer CVE2' may be substantially the same as or similar to the second constant voltage electrode layer CVE2 described with reference to FIG. 11, except that it is located under the sensing-insulating layer TIL.

Likewise, the second transmission line layer SL1'_L may be substantially the same as or similar to the second transmission line layer SL1_U described with reference to FIG. 11, except that it is located under the sensing-insulating layer TIL.

Referring to FIG. 22, the first conductive layer CL1' may include a first constant voltage electrode layer CVE1' and a first transmission line layer (SL1'_U).

Here, the first constant voltage electrode layer CVE1' may be substantially the same as or similar to the first constant voltage electrode layer CVE1 described with reference to FIG. 10, except that it is located on the sensing-insulating layer TIL.

Likewise, the first transmission line layer SL1'_U may be substantially the same as or similar to the first transmission line layer SL1_L described with reference to FIG. 10, except that it is located on the sensing-insulating layer TIL.

Figure 23:
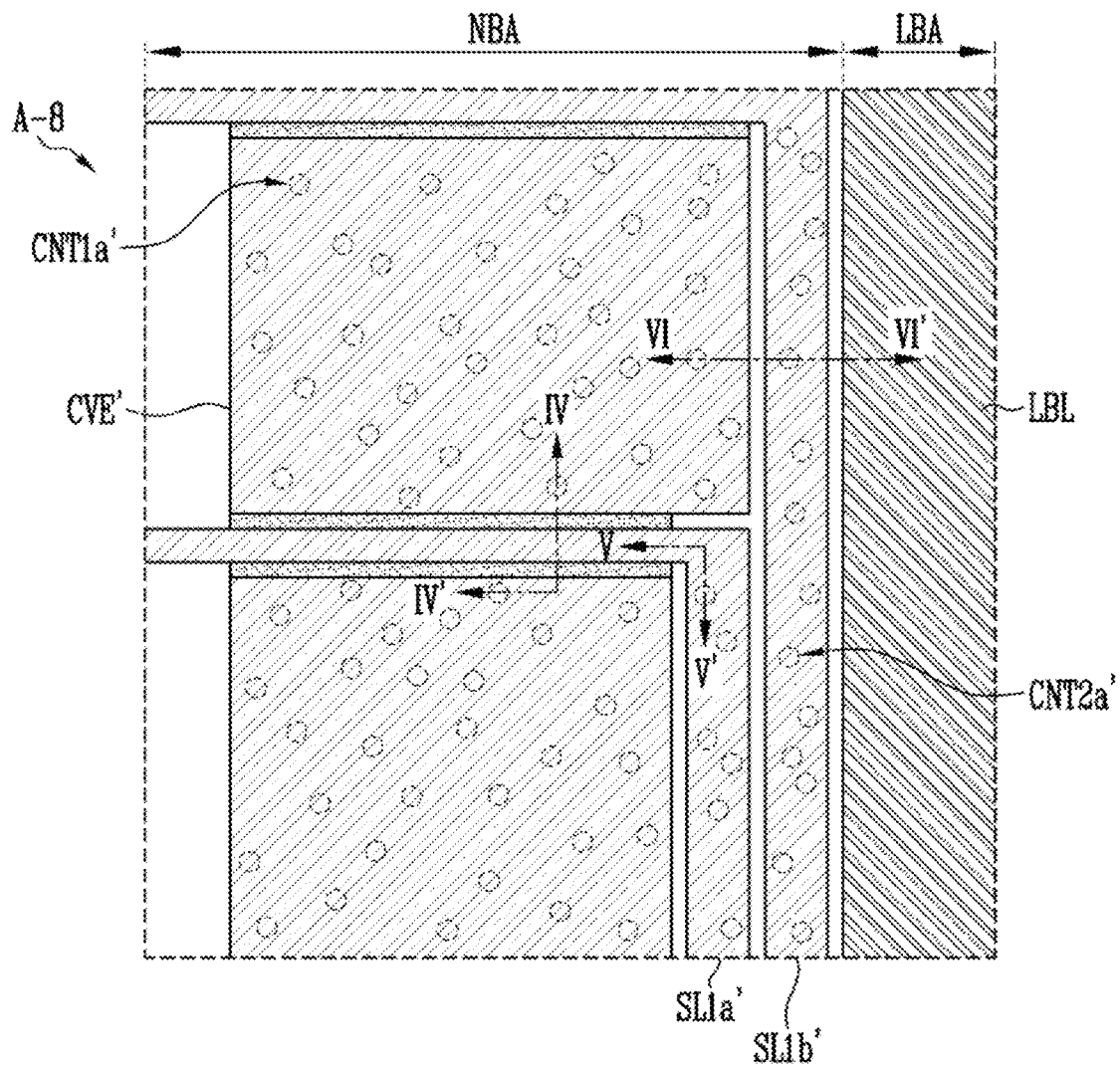
FIG. 23 is an enlarged plan view of an area A of FIG. 6 and is a plan view for describing the eighth embodiment of the present disclosure.
Figure 23:
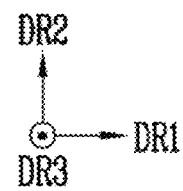
Figure 24:
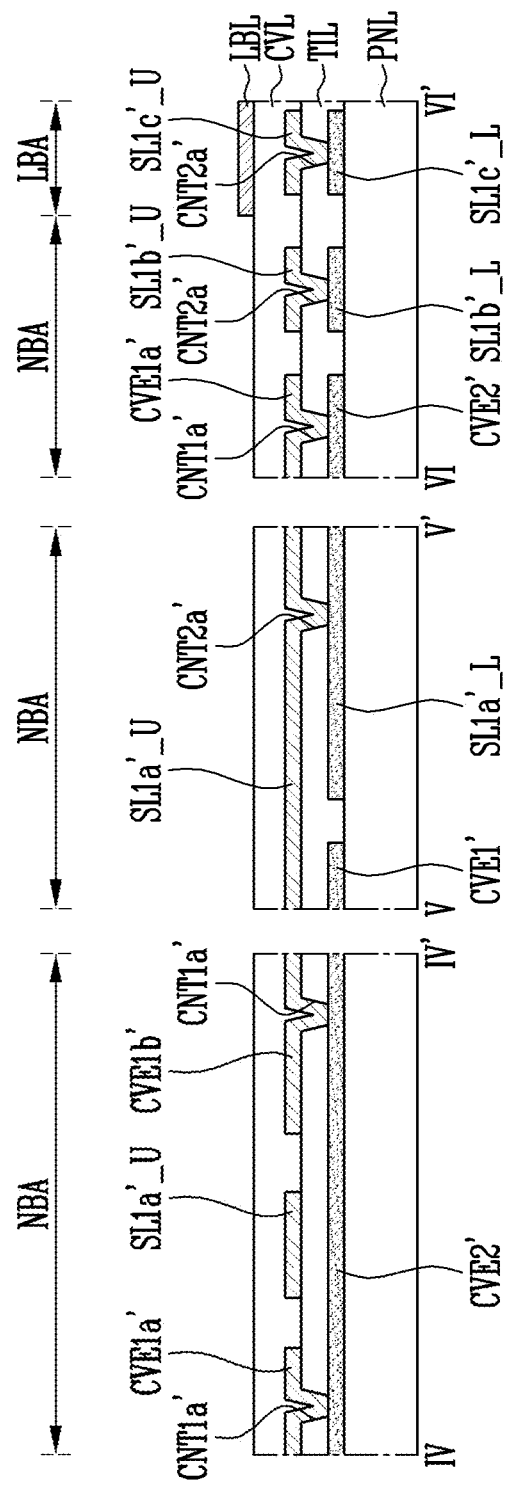
FIG. 24 is a cross-sectional view taken along the lines IV-IV', VV', and VI-VI' of FIG. 23.

FIG. 23 is an enlarged plan view of an area A of FIG. 6 and is a plan view for describing the eighth embodiment of the present disclosure. FIG. 24 is a cross-sectional view taken along the lines IV-IV', VV', and VI-VI' of FIG. 23.

Referring to FIGS. 23 and 24, the first constant voltage electrode layer CVE1' and the second constant voltage electrode layer CVE2' may electrically contact each other through a plurality of first through holes CNT1a' defined in the sensing-insulating layer TIL, and the first transmission line layer SL1'_U and the second transmission line layer SL1'_L may electrically contact each other through a plurality of second through holes CNT2a' defined in the sensing-insulating layer TIL.

Here, the plurality of first through holes CNT1a' and the plurality of second through holes CNT2a' may be substantially the same as or similar to the plurality of first through holes CNT1a and the plurality of second through holes CNT2a described with reference to FIG. 12.

Meanwhile, unlike what is shown in FIG. 23, the shapes and/or the arrangement in various embodiments described with reference to FIGS. 14 to 19, may be identically or similarly applied to the plurality of first through holes CNT1a' and the plurality of second through holes CNT2a'.

While the present disclosure has been shown and described with reference to certain embodiments thereof, it will be understood by those skilled in the art that various changes in forms and details may be made therein without departing from the spirit and scope of the present disclosure as defined by the appended claims, with functional equivalents thereof to be included therein.

What is claimed is:

1. A display device comprising:
   a panel layer comprising pixels in a display area;
   a light-blocking layer above the panel layer, and defining a light-blocking area surrounding at least a portion of the display area in a plane view; and
   an input-sensing layer between the panel layer and the light-blocking layer, defining a sensing area corresponding to the display area, and comprising:
      a first conductive layer comprising a first constant voltage electrode layer, at least a portion of which being in a non-light-blocking area between the light-blocking area and the display area in a plane view;
      a second conductive layer comprising a second constant voltage electrode layer, at least a portion of which being in the non-light-blocking area, and electrically contacting the first constant voltage electrode layer through first through holes in the non-light-blocking area; and
      a sensing-insulating layer between the first conductive layer and the second conductive layer, and defining the first through holes,
   wherein respective distances between respective adjacent ones of the first through holes vary.

2. The display device of claim 1, wherein, in a plane view, the first through holes have a planar shape comprising a circle, an oval, or a polygon.

3. The display device of claim 2, wherein the first through holes have a same planar shape.

4. The display device of claim 1, wherein, in a plane view, an area occupied by the first through holes in the non-light-blocking area is about 0.5% or more and about 10% or less of an area where the first constant voltage electrode layer and the second constant voltage electrode layer overlap each other in the non-light-blocking area.

5. The display device of claim 1, wherein the first constant voltage electrode layer comprises a first constant voltage electrode pattern and a second constant voltage electrode pattern spaced apart in a plane view, and electrically contacting the second constant voltage electrode layer through the first through holes.

6. The display device of claim 5, wherein the first conductive layer further comprises a first transmission line layer having at least a portion in the non-light-blocking area,
   wherein the second conductive layer further comprises a second transmission line layer having at least a portion in the non-light-blocking area, and
   wherein the first transmission line layer and the second transmission line layer electrically contact each other in the non-light-blocking area through second through holes defined in the sensing-insulating layer.

7. The display device of claim 6, wherein, in a plane view, the second constant voltage electrode layer is between the second transmission line layer and the sensing area, and
   wherein the first transmission line layer comprises a portion extending in a direction toward the sensing area between the first constant voltage electrode pattern and the second constant voltage electrode pattern.

8. The display device of claim 6, wherein the first transmission line layer and the second transmission line layer are electrically insulated from the first constant voltage electrode layer and the second constant voltage electrode layer.

9. The display device of claim 6, wherein respective distances between adjacent ones of the second through holes vary.

10. The display device of claim 1, wherein one of the first conductive layer or the second conductive layer further comprises, in the sensing area, first sensing electrode patterns, second sensing electrode patterns, and a second connection pattern electrically connecting the second sensing electrode patterns, and wherein another of the first conductive layer or the second conductive layer further comprises a first connection pattern in the sensing area, and electrically connecting the first sensing electrode patterns.

11. The display device of claim 10, wherein the first sensing electrode patterns are electrically insulated from the second sensing electrode patterns.

12. A display device comprising:
a panel layer comprising pixels in a display area;
a light-blocking layer above the panel layer, and defining a light-blocking area surrounding at least a portion of the display area in a plane view; and
an input-sensing layer between the panel layer and the light-blocking layer, defining a sensing area corresponding to the display area, and comprising:
a first conductive layer comprising a first constant voltage electrode layer having at least a portion in a non-light-blocking area between the light-blocking area and the display area;
a second conductive layer comprising a second constant voltage electrode layer having at least a portion in the non-light-blocking area, and electrically contacting the first conductive layer through first through holes in the non-light-blocking area; and
a sensing-insulating layer between the first conductive layer and the second conductive layer, and defining the first through holes,
wherein, in a plane view, an area occupied by the first through holes in the non-light-blocking area is about 0.5% or more and about 5% or less of an area where the first constant voltage electrode layer and the second constant voltage electrode layer overlap each other in the non-light-blocking area.

13. The display device of claim 12, wherein respective distances between adjacent ones of the first through holes are constant.

14. The display device of claim 12, wherein, in a plane view, the first through holes have a planar shape comprising a circle, an oval, or a polygon.

15. The display device of claim 14, wherein the first through holes have a same planar shape.

16. The display device of claim 12, wherein the first constant voltage electrode layer comprises a first constant voltage electrode pattern and a second constant voltage electrode pattern spaced apart in a plane view, and wherein the first constant voltage electrode pattern and the second constant voltage electrode pattern electrically contact the second constant voltage electrode layer through the first through holes.

17. The display device of claim 16, wherein the first conductive layer further comprises a first transmission line layer having at least a portion in the non-light-blocking area, wherein the second conductive layer further comprises a second transmission line layer having at least a portion in the non-light-blocking area, and wherein, in the non-light-blocking area, the first transmission line layer and the second transmission line layer electrically contact each other through second through holes defined in the sensing-insulating layer.

18. The display device of claim 17, wherein, in a plane view, the second constant voltage electrode layer is between the second transmission line layer and the sensing area, and wherein the first transmission line layer comprises a portion extending in a direction toward the sensing area through a space between the first constant voltage electrode pattern and the second constant voltage electrode pattern.

19. The display device of claim 17, wherein the first transmission line layer and the second transmission line layer are electrically insulated from the first constant voltage electrode layer and the second constant voltage electrode layer.

20. The display device of claim 17, wherein, in a plane view, an area occupied by the second through holes in the non-light-blocking area is about 0.5% or more and about 5% or less of an area where the first transmission line layer and the second transmission line layer overlap each other in the non-light-blocking area.

* * * * *